United States Patent
Kawai et al.

(10) Patent No.: US 7,353,309 B2
(45) Date of Patent: Apr. 1, 2008

(54) BUS SYSTEM, BUS MANAGER DEVICE, NODE DEVICE, AND PROGRAM FOR BUS MANAGER DEVICE

(75) Inventors: Jun Kawai, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 11/267,153

(22) Filed: Nov. 7, 2005

(65) Prior Publication Data
US 2007/0011380 A1    Jan. 11, 2007

(30) Foreign Application Priority Data
Jul. 11, 2005    (JP)    ............... 2005-201079

(51) Int. Cl.
*G06F 13/362*    (2006.01)
(52) U.S. Cl. .................. 710/116; 710/118; 370/447
(58) Field of Classification Search ................ 710/107, 710/112–117; 370/447
See application file for complete search history.

(56) References Cited

U.S. PATENT DOCUMENTS

| 6,889,276 B2 * | 5/2005 | Brown ....................... 710/114 |
| 7,131,135 B1 * | 10/2006 | Virag et al. .................... 725/80 |
| 2007/0038793 A1 * | 2/2007 | Wehage et al. ............. 710/305 |

FOREIGN PATENT DOCUMENTS

| JP | 2000-020458 | 1/2000 |
| JP | 2003-030133 | 1/2003 |

* cited by examiner

*Primary Examiner*—Clifford Knoll
(74) *Attorney, Agent, or Firm*—Arent Fox, LLP.

(57) ABSTRACT

In a bus system, in accordance with reservations of transfers of isochronous blocks of data and with requests by the node devices for transfers of ones of the isochronous blocks of data and regular blocks of data, a bus manager generates a schedule of the operating rate of a bus channel, the frequency of assignment of the bus channel, and the size of a continuously transferred piece of data on the bus channel for each of the blocks of data, so that the piece of data is transferred at the operating rate of the bus channel as low as possible in each transfer cycle.

11 Claims, 24 Drawing Sheets

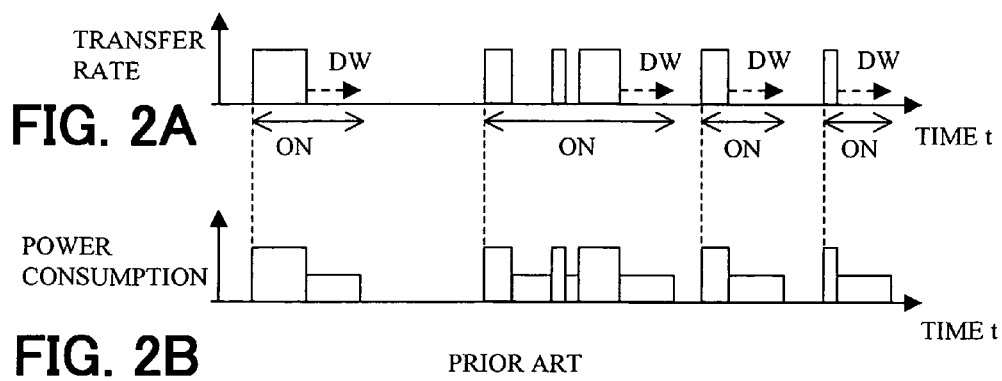
FIG. 2A
FIG. 2B PRIOR ART
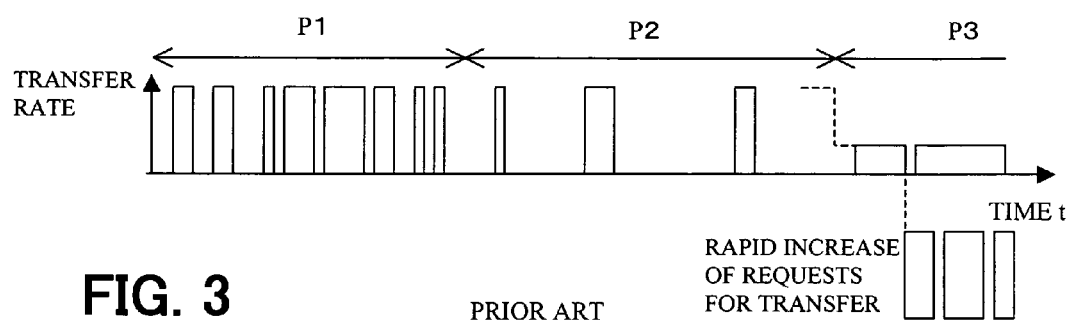
FIG. 3 PRIOR ART
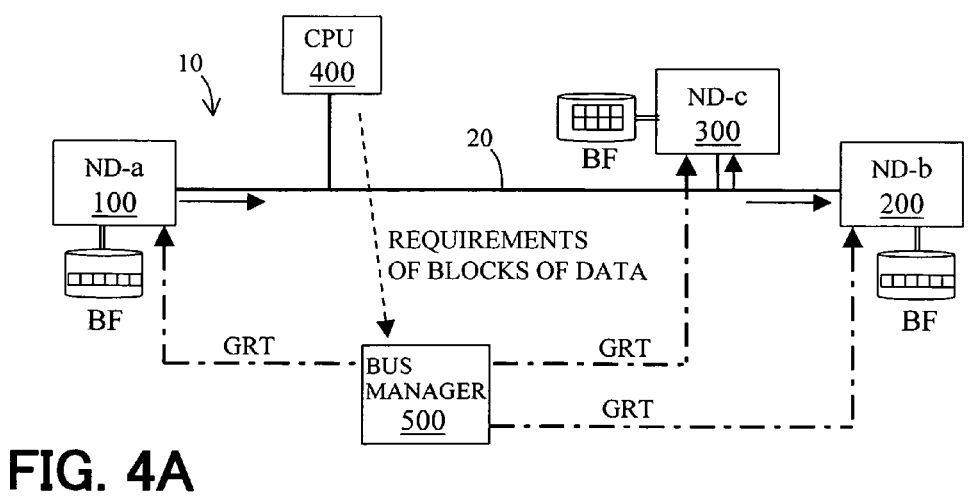
FIG. 4A

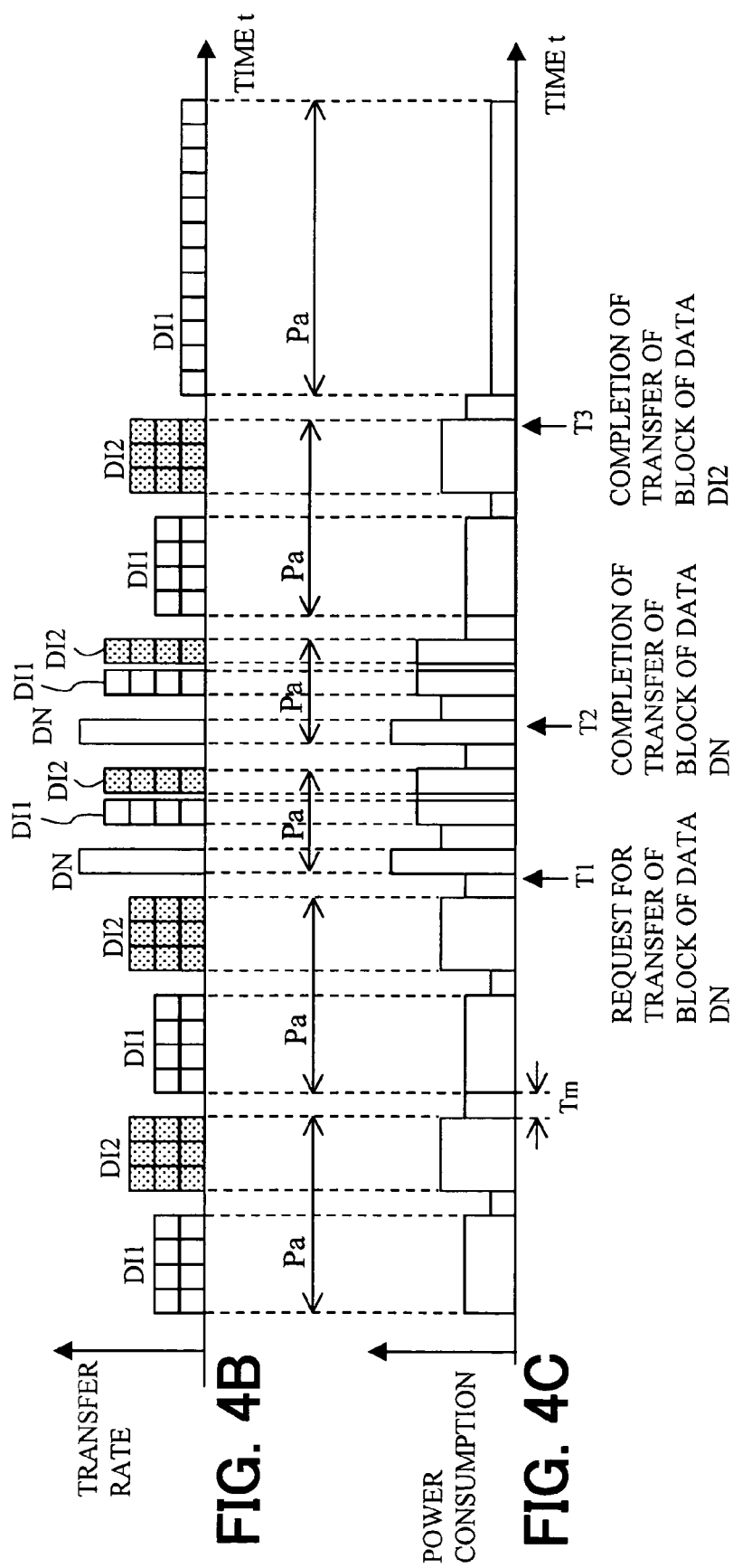

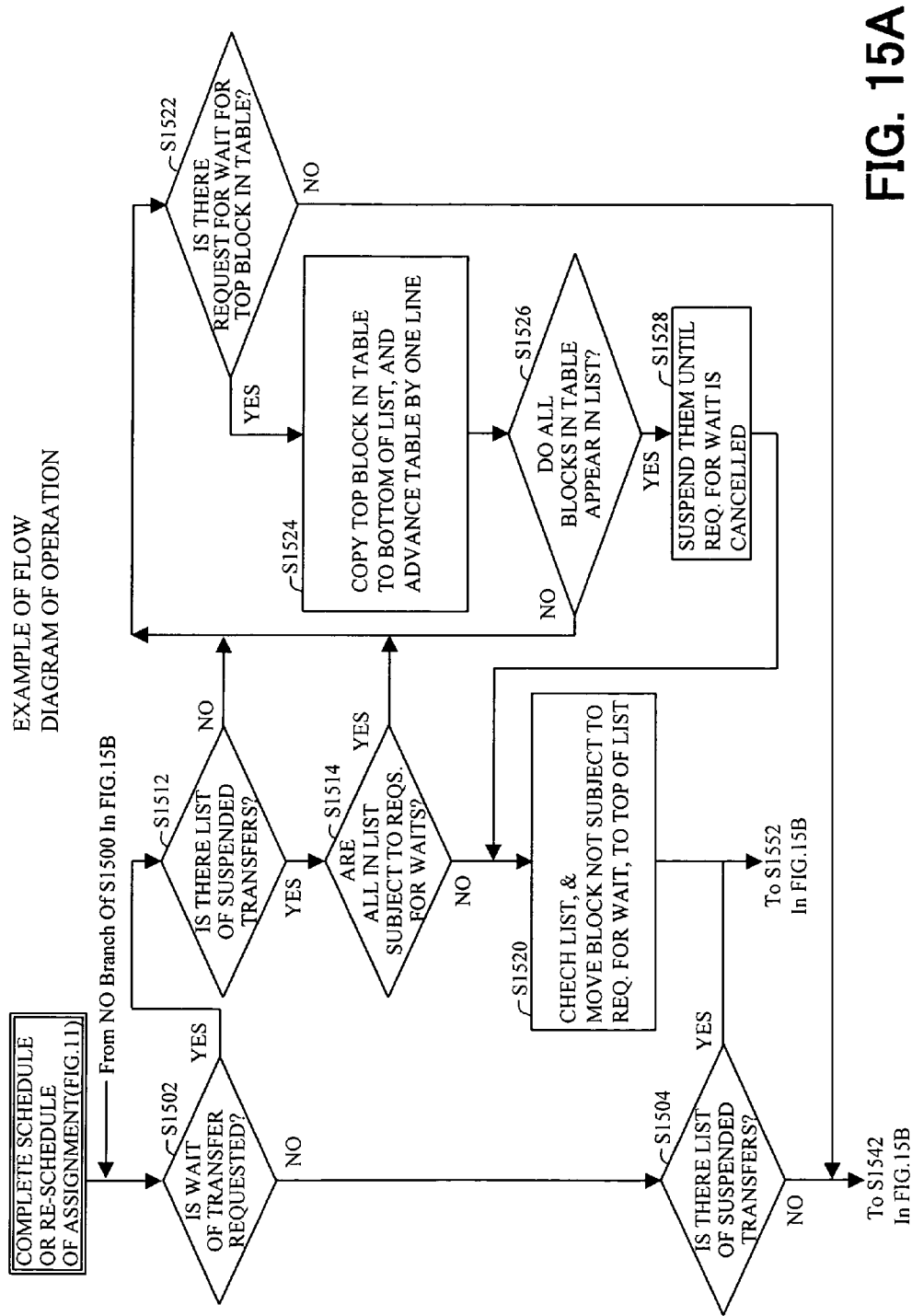

TABLE OF SEQUENCE OF CHANNEL
GRANTS FOR TRANSFERS

1: node(1)-block(1)
2: node(2)-block(3)
3: node(1)-block(2)
4: node(2)-block(3)

5: return to "1"

FIG. 16A

↓ ADVANCE TABLE
↓ BY ONE LINE

TABLE OF SEQUENCEOF CHANNEL
GRANTS FOR TRANSFERS

4: node(1)-block(1)
1: node(2)-block(3)
2: node(1)-block(2)
3: node(2)-block(3)

5: return to "1"

FIG. 16B

LIST OF SUSPENDED
TRANSFERS

1: node(1)-block(1)
2: node(2)-block(3)

FIG. 16C

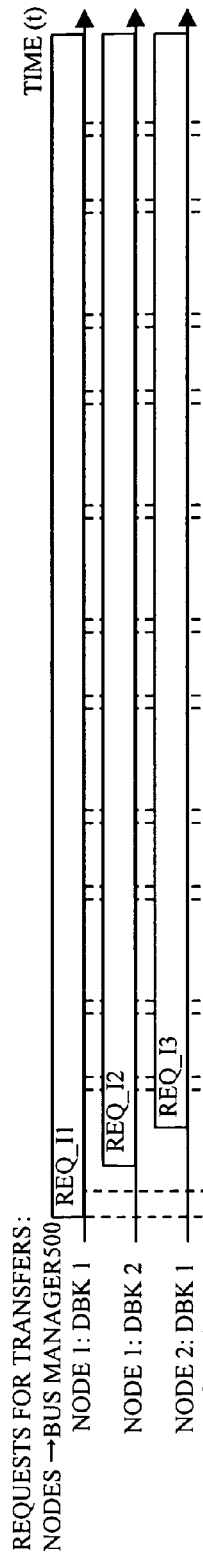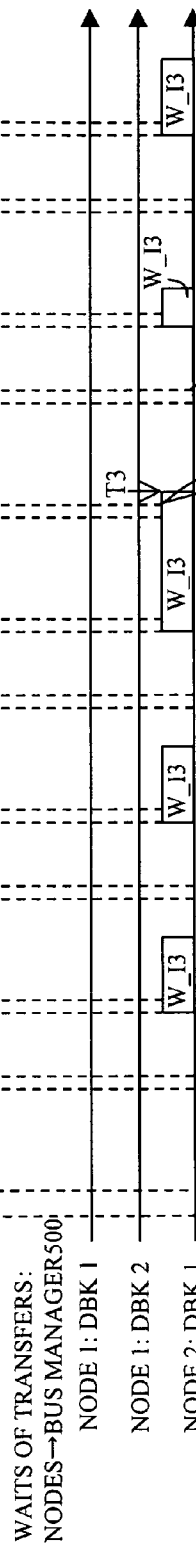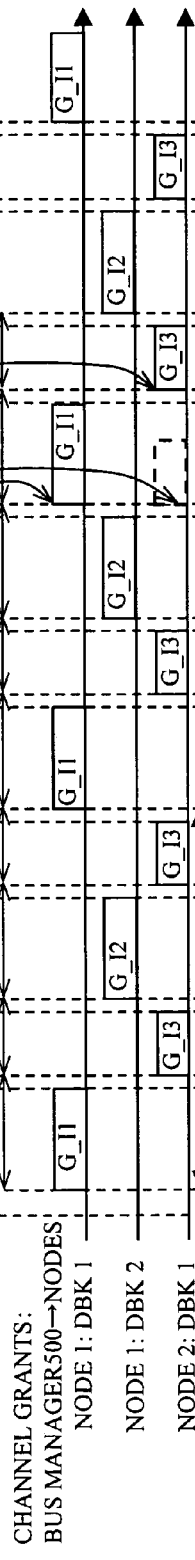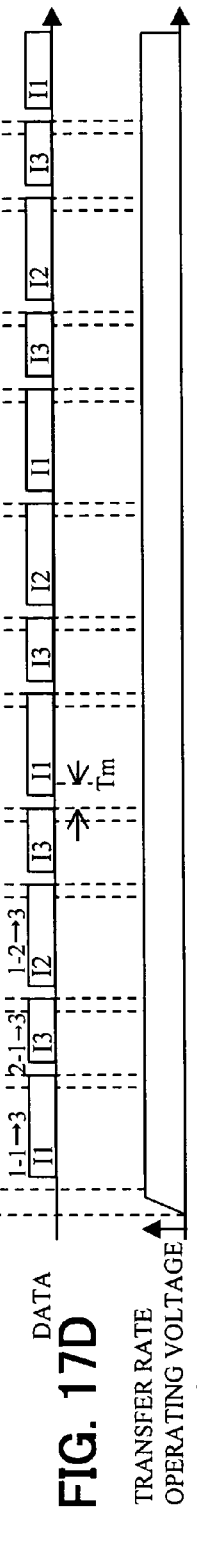

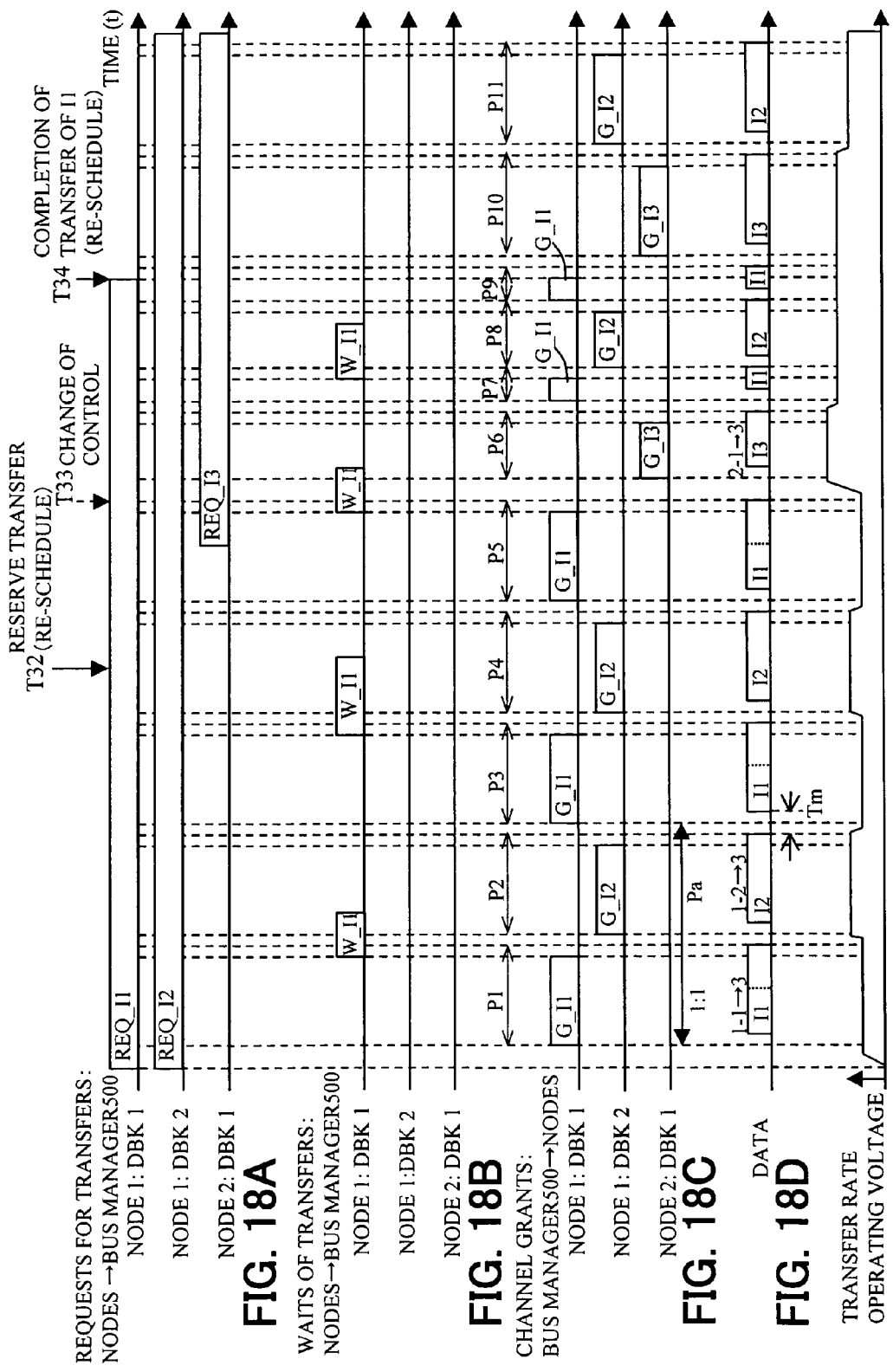

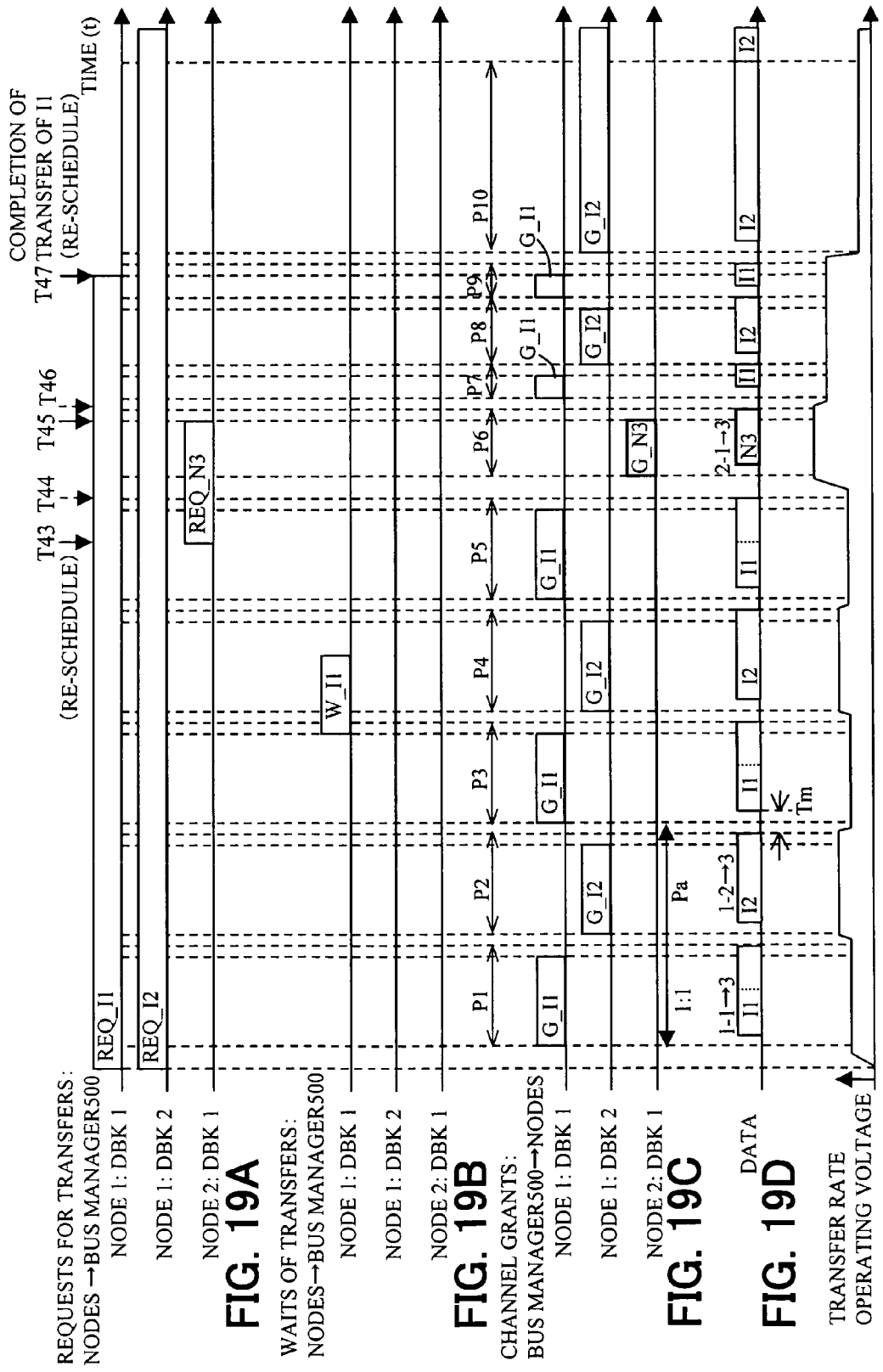

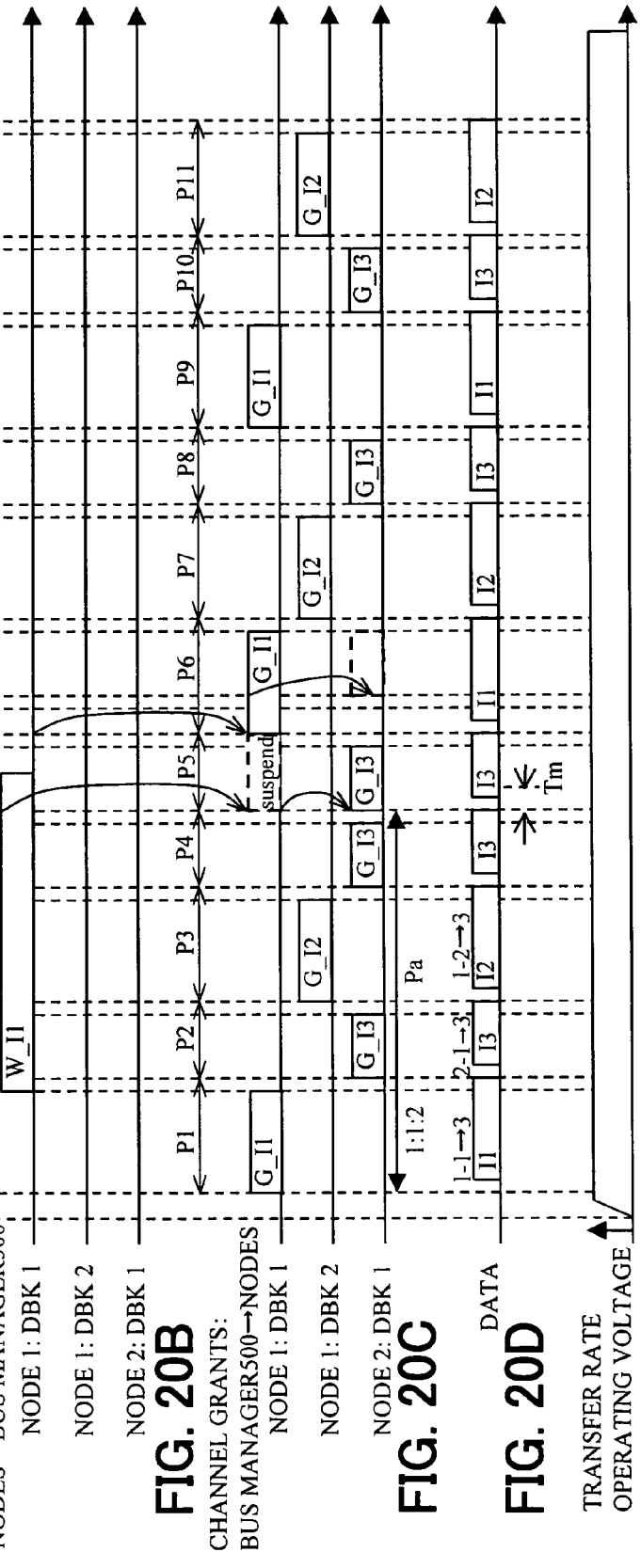

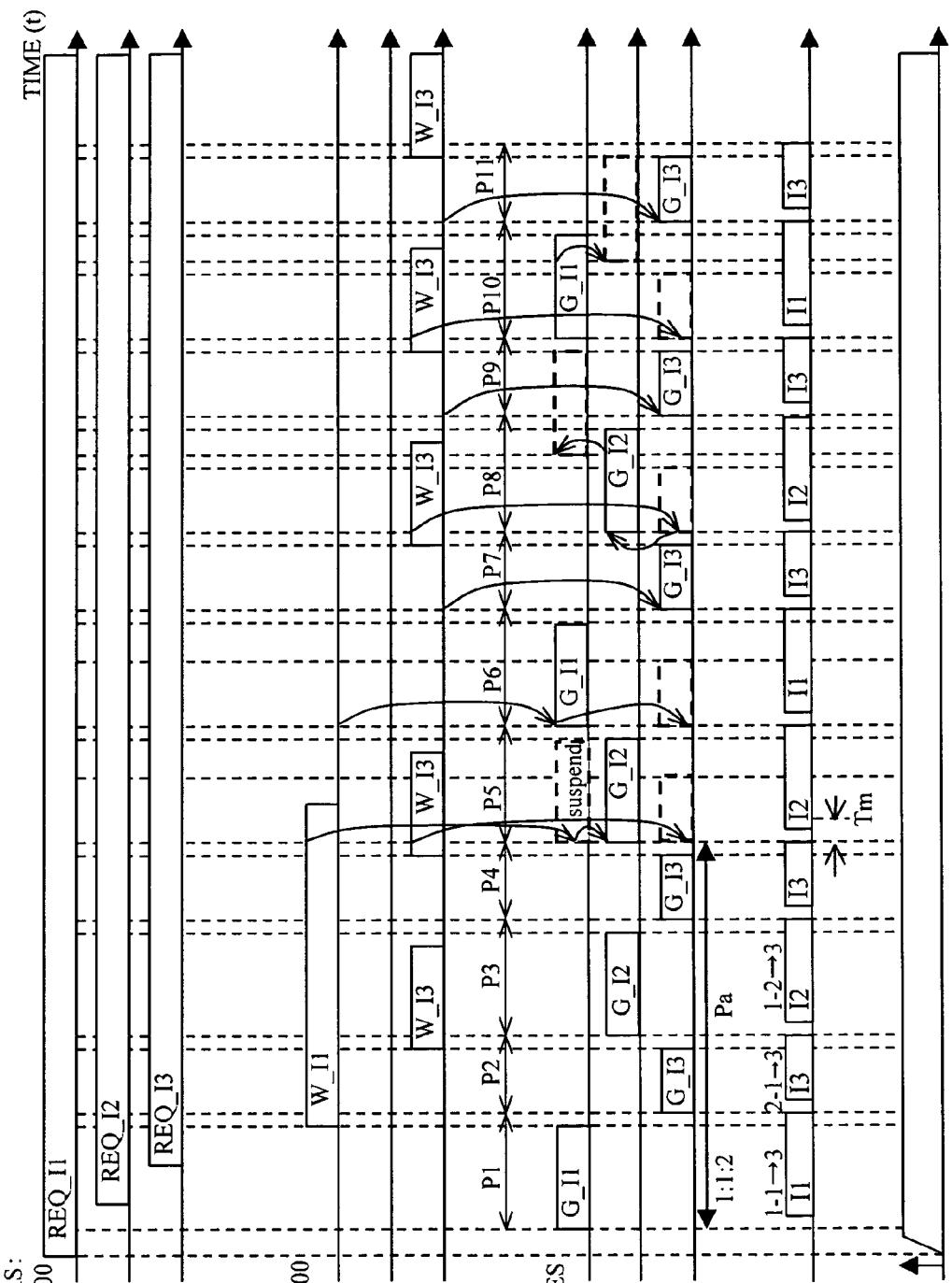

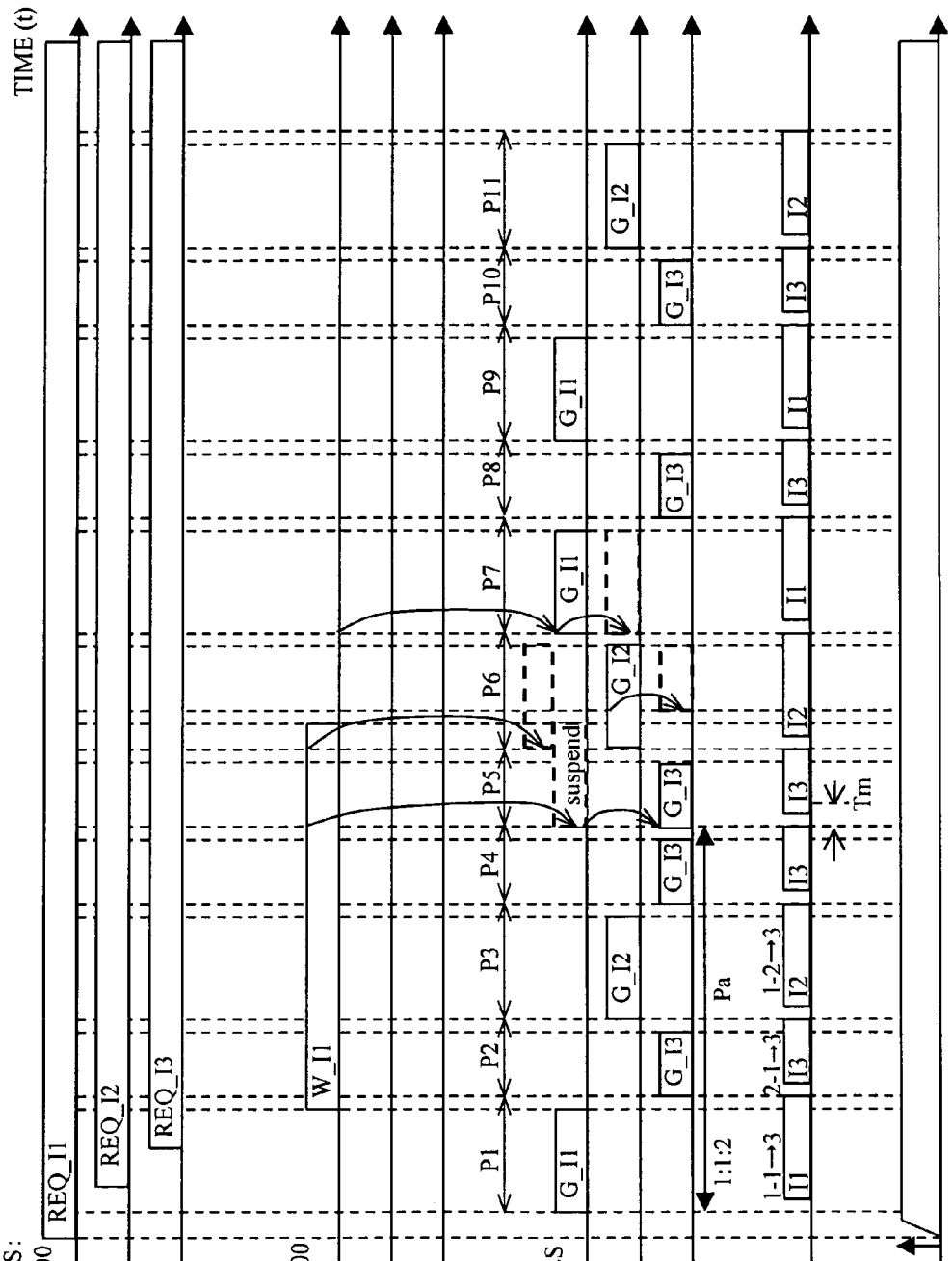

FIG. 23A REQUESTS FOR TRANSFERS: NODES→BUS MANAGER500
- NODE 1: DBK 1 — REQ_I1
- NODE 1: DBK 2 — REQ_I2
- NODE 2: DBK 1 — REQ_I3

FIG. 23B WAITS OF TRANSFERS: NODES→BUS MANAGER500
- NODE 1: DBK 1 — W_I1
- NODE 1: DBK 2
- NODE 2: DBK 1 — W_I3, W_I3, W_I3, W_I3, W_I3, W_I3

FIG. 23C CHANNEL GRANTS: BUS MANAGER500→NODES
- NODE 1: DBK 1 — G_I1, G_I2, suspend, G_I1, G_I1, G_I2
- NODE 1: DBK 2 — G_I2
- NODE 2: DBK 1 — G_I3, G_I3, G_I3, G_I3, G_I3

FIG. 23D DATA — I1, I3, I2, I3, I2, I3, I1, I3, I1, I3, I2

FIG. 23E TRANSFER RATE OPERATING VOLTAGE

BUS SYSTEM, BUS MANAGER DEVICE, NODE DEVICE, AND PROGRAM FOR BUS MANAGER DEVICE

FIELD OF THE INVENTION

The present invention relates generally to a bus system, and in particular to an information processing device for transferring audio/visual (A/V) information between a plurality of nodes via an internal bus.

BACKGROUND OF THE INVENTION

In conventional A/V information household electronic appliances, a bus system transfers two different kinds of data, i.e., a first kind of data to be transferred isochronously or in real time, such as an A/V stream of data, and a second kind of non-isochronous or regular data. The control for maintaining the isochronism of the isochronous transfer is performed by software of the bus system. Hardware of the bus system only manages a grant of the bus to each node at each transfer cycle. Thus, the software manages how a plurality of isochronous transfers of data should be performed and what amounts of regular transfers of data are generated, and then controls the sequence of the plurality of data transfers and controls each isochronous transfer in a sufficiently small unit of data so as to prevent a failure in the isochronous transfers. In a bus system in compliance with the isochronous data transfer of IEEE 1394, periods of time for isochronous data transfer are reserved periodically. In any types of the bus systems, in order to prevent buffer overflow and underflow in the isochronous transfer, the bus is typically operated at the maximum operating rate of the bus or at the operating rate specific to each node. In a bus system without requirements for provisions of such isochronous transfer, in order to reduce the power consumption of the bus system, the operating rates and the operating voltages of the entire bus system may be changed in accordance with the statistics or the like of accesses to the bus, or alternatively the power supply itself may be frequently turned on and off.

Japanese Patent Application Publication JP 2000-20458-A describes a bus control circuit. In this bus control circuit, an arbiter has the functions of: monitoring a control signal and a data line in accordance with a signal from a bus monitoring circuit of a bridge that indicates the operating state of the bus; monitoring another control line and another data line in accordance with another signal from the bus monitoring circuit; and thereby issuing a grant to each channel device for a transaction start request. The arbiter controls the two data lines to operate as 32-bit PCI buses or as a 64-bit PCI buses. When the data lines are operated as the 32-bit PCI buses, the arbiter controls two 32-bit channel devices to use the respective different 32-bit PCI buses.

Japanese Patent Application Publication JP 2003-30133-A describes a bus type arbitration system. In this system, a bus arbiter determines the bus efficiency of functional blocks and control blocks connected to the bus, then assigns data transfer band width of the bus to the functional blocks and a CPU so that an expected value of the data transfer rate should be satisfied, and thereby satisfies the data transfer rate of the bus required in the system in real time. Further, in accordance with the requirements of the system, the CPU determines the expected values of data transfer rates of the bus for the functional blocks and the CPU, and then registers the values with the bus arbiter.

SUMMARY OF THE INVENTION

In accordance with an aspect of the present invention, a bus system comprises a plurality of node devices interconnected via a bus, and a bus manager device connected to the plurality of node devices via respective bus control lines. The bus manager device receives one or more reservations of transfers of isochronous blocks of data to be transferred by corresponding one or more of the plurality of node devices. In accordance with information on the one or more reservations of transfers of the isochronous blocks of data and with one or more requests for transfers of respective ones of the isochronous blocks of data and regular blocks of data, which requests are provided by one or more of the plurality of node devices, the bus manager device generates a schedule of the operating rate of a bus channel, the frequency of assignment of the bus channel, and the size of a continuously transferred piece of data on the bus channel for each of the respective blocks of data, so that the piece of data is transferred at the operating rate of the bus channel as low as possible in each transfer cycle. The bus manager device determines assignment of the bus channel to the blocks of data in accordance with the schedule and with the one or more requests for transfers of the respective blocks of data. The bus manager device provides information on the operating rate of the bus channel for each block of data and issues a grant of the bus channel, during a period of time determined in accordance with the size of the continuously transferred piece of data for that block of data and with the operating rate of the bus channel for that block of data, via the bus control line to one of the one or more node devices that transfers that block of data. The one node device that transfers that block of data maintains the request for transfer of that block of data, until the transfer of that block of data being requested for transfer is completed. In response to a grant of the bus channel for that block of data that is issued by the bus manager device, the one node device transfers the piece of data of that block of data to another node device at the operating rate of the bus channel during the period of time of the grant of the bus channel, the operating rate being contained in the information received by the one node device.

The invention also relates to a program (which may be recorded on a recording medium) for implementing the bus manager device described above.

The invention will be described with reference to the accompanying drawings. Throughout the drawings, similar symbols and numerals indicate similar items and functions.

BRIEF DESCRIPTION OF THE DRAWINGS

FIGS. 2A and 2B show the data transfer and the power consumption, respectively, of the bus system, in which the power supply of the bus system is turned on and off depending on the presence and absence of requests for data transfer;

FIG. 3 shows data transfer, the data transfer rate of which is controlled to be changed depending on the traffic on the bus;

FIG. 4A shows a configuration of a bus system in accordance with the principle of the invention, and FIGS. 4B and 4C are a time chart of transferring isochronous blocks of data and non-isochronous or a regular block of data between a plurality of nodes in the bus system, and of the power consumption of the bus system, respectively;

FIGS. 15A and 15B show a flow chart of processing for issuing grants of the bus channel to the data block managers, which is performed by the data block controller of the bus manager after the scheduling or re-scheduling of the assignment of the bus channel for transferring the blocks of data as shown in FIG. 11;

FIGS. 16A and 16B show examples of a table of a sequence of issuing grants of the bus channel for transferring blocks of data, and FIG. 16C shows an example of a list of identifiers of suspended transfers of blocks of data;

FIGS. 17A-17E show an example of a time chart of generation of requests for transfer of blocks of data, waits of transfer, grants of the bus channel issued by the bus manager, and pieces of data transferred on the bus channel, and the change of the transfer rate on the bus channel, in the case that there is no change in reservations of transfers of isochronous blocks of data and that no transfer of a regular block of data is generated;

FIGS. 18A to 18E show an example of a time chart of generation of requests for transfer of blocks of data, waits of transfer, grants of the bus channel issued by the bus manager, and pieces of data transferred on the bus channel, and the change of the transfer rate on the bus channel, for the blocks of data of the nodes, in the case that a reservation of a transfer of an additional isochronous block of data is generated during the reserved transfers of the isochronous blocks of data;

FIGS. 19A to 19E show an example of a time chart of generation of requests for transfer of blocks of data, waits of transfer, grants of the bus channel issued by the bus manager, and pieces of data transferred on the bus channel, and the change of the transfer rate on the bus channel, for a blocks of data of the nodes, in the case that a request for a transfer of a further regular block of data is generated during the transfer of the reserved transfers of the isochronous blocks of data;

FIGS. 20A-20E show an example of a time chart of generation of requests for transfer of blocks of data, waits of transfer, grants of the bus channel issued by the bus manager, and pieces of data transferred on the bus channel, and the change of the transfer rate on the bus channel, for the blocks of data of the nodes, in the case that a wait of transfer of the block of data in the node remains in a cycle during which the block of data should be transferred;

FIGS. 21A to 21E show an example of a time chart of generation of requests for transfer of blocks of data, waits of transfer, grants of the bus channel issued by the bus manager, and pieces of data transferred on the bus channel, and the change of the transfer rate on the bus channel, for the blocks of data of the nodes, in the case that waits of transfer of the blocks of data of the nodes remain in cycles during which the blocks of data should be transferred;

FIGS. 22A to 22E show an example of a time chart of generation of requests for transfer of blocks of data, waits of transfer, grants of the bus channel issued by the bus manager, and pieces of data transferred on the bus channel, and the change of the transfer rate on the bus channel, for the blocks of data of the nodes, in the case that a wait of transfer of the block of data of the node remains in a cycle where the block of data should be transferred;

FIGS. 23A to 23E show an example of a time chart of generation of requests for transfer of blocks of data, waits of transfer, grants of the bus channel issued by the bus manager, and pieces of data transferred on the bus channel, and the change of the transfer rate on the bus channel, for the blocks of data of the nodes, in the case that a wait of transfer of the block of data of the node remains in two successive cycles where the block of data should be transferred and that another wait of transfer of the other block of data of the other node remains even in a cycle where the other block of data should be transferred.

DESCRIPTION OF THE PREFERRED EMBODIMENTS

In the bus system in compliance with the isochronous transfer of IEEE 1394, there is an upper limit on the band width of transmission frequencies. Even if there is an unused portion of the band width used for a regular transfer, this band width portion cannot be used for an isochronous transfer. Further, even if a specific transmission period of time for an isochronous transfer is not fully used, the remaining portion of the period of time cannot be used for another isochronous transfer or the like. Further, the isochronous transfer can be performed only at the operating rate specific to each node. Further, each of the transmitting node and the receiving node requires a data buffer for isochronous transfer having a capacity of buffering data which is larger than the possible amount of data transferred during a predetermined time length of one cycle. This requirement increases the size of the hardware. Further, in the conventional bus system, the bus is operated at the maximum operating rate of the bus or the operating rate specific to the node, and hence the power consumption is large even when there is an unused portion of the transmission band width of the bus. In the bus system without requirement for provisions of isochronous transfer, there may be a waiting time protracted until the operating rates and the operating voltages in the entire bus system are changed or until the power supply itself is turned off, or the number of times of switching operations per unit time may increase so that large variation of the electric power can occur frequently, which requires a robust power supply capable of withstanding the electric power variations.

The inventors have recognized that, in a bus system, blocks of data can be transferred between nodes in bus channels at the possible lower operating rates of the bus channels and at the possible lower operating voltages of the bus channels, depending on the traffic of the bus channels, so that the entire power consumption for the transfers is reduced.

An object of the present invention is to minimize the operating rate and voltage of a bus channel for transfer data in a bus system depending on the traffic of the bus channel, to reduce the power consumption for the transfer in the bus system.

Another object of the invention is to facilitate stable isochronous transfer of data in a bus system which integrates the isochronous transfer of data and non-isochronous transfer of data.

According to the invention, the operating rate and voltage of a bus channel for transfer data in a bus system are minimized depending on the traffic of the bus channel, to thereby reduce the power consumption for the transfer in the bus system, and also stable isochronous transfer is facilitated in a bus system which integrates the isochronous transfer of data and non-isochronous transfer of data.

Figure 1A:
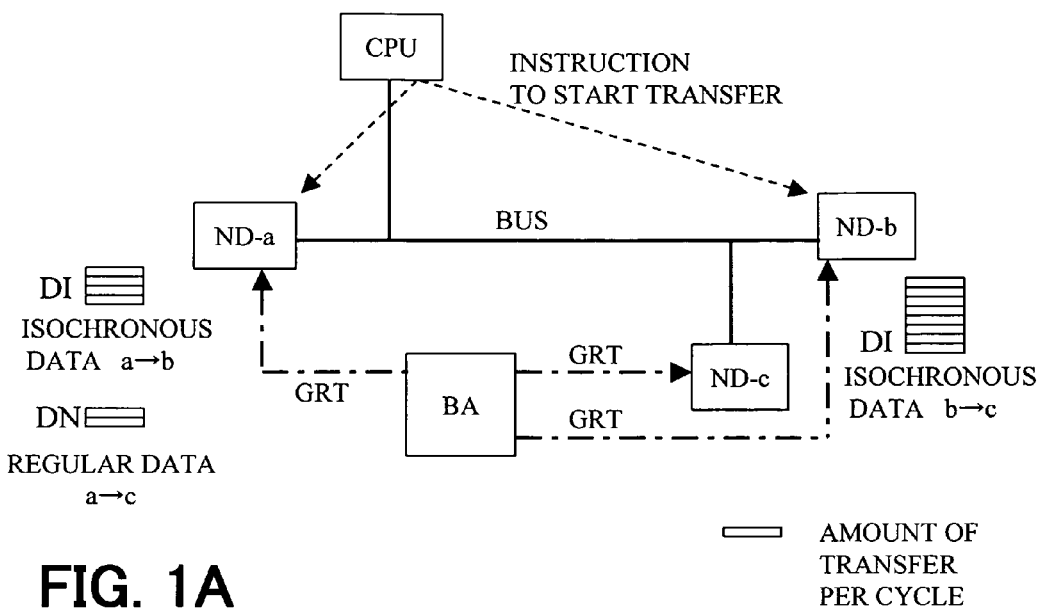
FIGS. 1A and 1B show the configuration of a conventional bus system, and a time chart of transferring isochronous blocks of data and regular blocks of data between a plurality of nodes in the bus system, respectively.
Figure 1B:
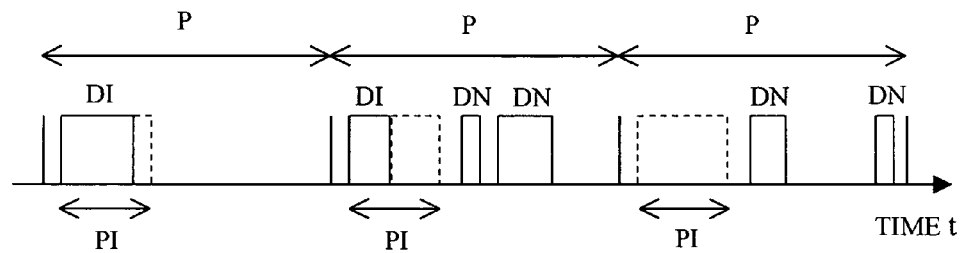

FIG. 1A shows the configuration of a conventional bus system, and FIG. 1B is a time chart of transferring isochronous blocks of data DI and non-isochronous or regular blocks of data DN between a plurality of nodes ND-a, ND-b and ND-c in the bus system.

In the bus system of FIG. 1A, when there occur requests for transferring isochronous blocks of data DI, such as A/V streams of data, from a node ND-a to a node ND-b and from a node ND-b to a node ND-c, and there occurs another request for transferring a non-isochronous or regular block of data DN from the node ND-a to the node ND-c, a bus arbiter BA issues grants GRT's of use of a bus in response to these respective transfer requests. In FIG. 1B, during a period of time PI in each transfer cycle P that is reserved for the transfer of the isochronous block of data DI, the isochronous block of data DI is transferred at a predetermined data transfer rate, so that there may be a blank interval during the period of time PI. When there is a request for transferring the regular block of data DN, the regular block of data DN is transferred at a predetermined transfer rate during a remaining period of time after the period of time PI within the transfer cycle P, which remaining period is reserved for transferring the regular block of data DN, so that there may be a blank interval during the remaining period of time.

FIGS. 2A and 2B show the data transfer and the power consumption, respectively, of the bus system, in which the power supply of the bus system is turned on and off depending on the presence and absence of requests for data transfer. In this case, even if the data transfer stops, subsequently a wait for transferred data WD appears in duration of time before the power is turned off. Thus, the state of power-on is protracted for a while even after the data transfer stops.

FIG. 3 shows data transfer, the data transfer rate of which is controlled to be changed depending on the traffic on the bus. In the first transfer cycle P1, the traffic is heavy, and hence data is transferred at a higher transfer rate. In the next transfer cycle P2, the traffic decreases so that this decrease is detected. Then, in accordance with the resultant detection, in the next transfer cycle P3, data is transferred at a lower transfer rate. In this case, the operation of changing the transfer rate is delayed by one transfer cycle, so that there is a large blank interval in the transfer during the transfer cycle P2. On the other hand, when the amount of data requested for transferring increases rapidly during the transfer of the data at the lower transfer rate in the transfer cycle P3, there occurs a time delay in the data transfer, which may cause a suspension of isochronous data reproduction or a loss of the data in the reproduction at the receiving node.

FIG. 4A shows the configuration of a bus system 10 in accordance with the principle of the invention. FIGS. 4B and 4C are a time chart of transferring isochronous blocks of data DI1 and DI2 and a non-isochronous or regular block of data DN between a plurality of nodes ND-a, ND-b and ND-c in the bus system 10, and of the power consumption of the bus system 10, respectively. The CPU (central processing unit) 400 sends beforehand to the bus manager 500 a notification of the requirements and required properties of blocks of data, i.e., the upper and lower limits of the bus operating rate or transfer rate, the transfer priorities of the blocks of data, the sizes of an I/O buffer memory required for the blocks of data, the variable burst lengths for transferring the blocks of data, and the like. The bus manager 500 pre-stores the requirements and properties to thereby perform operations for the transfer. In response to the requests by nodes 100-300 for transfer of the blocks of data DI1, DI2 and DN, and in accordance with the requirements and properties of the blocks of data and with the traffic on the bus, the bus manager 500 issues, to the corresponding nodes 100-300, grants of use of bus channels GRT's of the bus for transferring the blocks of data.

The bus system 10 manages the data to be transferred in the unit of a group of data for isochronous transfer or for regular transfer, i.e. on a block-by-block basis, rather than in the conventional manner, i.e. on a conventional node-by-node basis or on a conventional transfer cycle-by-transfer cycle basis.

The bus manager 500 controls to transfer the blocks of data DI1, DI2 and DN in accordance only with the requirements and properties of the blocks of data DI1, DI2 and DN. The software of the bus manager 500 adjusts and controls the frequencies of assigning the bus, i.e. the ratio of the numbers of times of time allocation of the bus, to the corresponding nodes 100-300 for the respective blocks of data. The bus manager 500 arbitrates the bus on a data block-by-data block basis in accordance with the requirements and properties of the respective blocks of data for transfer and with the hardware properties of the corresponding nodes. The hardware properties include: the transfer band width, which is determined by the possible bus transfer rate, the data bit width, the overhead of the transfer and the like; the capacity of buffer memory of each node or its internal data block manager; and the burst length. When the burst length is variable and varies for the respective blocks of data, the burst length is also included in the transfer requested properties. In accordance with the requirements and properties of the respective blocks of data for transfer and the hardware configurations of the corresponding nodes 100-300, the bus manager 500 dynamically adjusts, on a data block-by-data block basis, the transfer cycles, the operating rates, the operating voltages, and the sizes of transferred data per transfer cycle, to thereby control the bus 20 and the nodes 100-300 so that they operate at the possible lowest bus operating rate and at the possible lowest operating voltage. This reduces the entire power consumption of the bus system 10.

The nodes 100-300 manage and control the transfer of blocks of data on a block-by-block basis. Each of the nodes 100-300 has data block managers in a number equal to the maximum number of blocks of data to handle simultaneously. In changing the hardware and/or the software applications of the nodes 100-300 for transmitting, receiving and utilizing the blocks of data, only the compatibility of the used software with the requirements and priorities of the blocks of data to be transferred may be considered, and hence the hardware and/or software change is relatively easy.

The bus manager 500 performs the bus arbitration essentially at the timing of generation or termination of a request for transfer of a block of data. Before the start of the isochronous transfer of data which transfer is generally continued in accordance with the predetermined requirements and properties, the software of the CPU 400 may register, with the bus manager 500, a reservation of the isochronous transfer of data so that the arbitration can be performed efficiently. The bus manager 500 reports information on the performance and/or the state of use of the bus 20, to the software of the CPU 400. In accordance with this information, the software of the CPU 400 can determine as to which ones of the applications of the nodes 100-300 can operate in the bus system 10, and can determine and provide services available to the user.

Referring to FIGS. 4A, 4B and 4C, for each arbitration cycle Pa, the bus manager 500 determines the transfer rates or operating rates, the operating voltages, the frequencies of assignment of the bus, the sizes of the continuously transferred units or pieces of data, the periods of time for the transferred units of data, the burst lengths and the like at the nodes 100-300 for the respective blocks of data DI1, DI2 and DN during each arbitration cycle Pa, to thereby arbitrate the use of the bus 20. In FIGS. 4B and 4C, at the beginning, the isochronous blocks of data DI1 and DI2 are alternately transferred at the respective lower transfer rates on the bus 20. If there appears no change in the assignment of the bus for transfer of the blocks of data, the possible blank intervals between the continuously transferred pieces of data of the blocks of data which pieces have the respective different burst lengths are essentially not longer than the maximum time length Tm unless the averaged transfer rate Rav of the data traffic on the bus goes below the minimum transfer rate Rmin of the bus. At a time T1, a request for transfer of a regular block of data DI is generated. Then, under the control of and the arbitration by the bus manager 500, the blocks of data DI1, DI2 and DI are transferred cyclically at the respective higher transfer rates. The maximum time length Tm corresponds to the maximum time of the overhead of adjusting the transfer rate and the like. At a time T2, the transfer of the block of data DN is completed. Then, under the control of and arbitration by the bus manager 500, the blocks of data DI1 and DI2 are caused to be alternately transferred again at the respective lower transfer rates which are the same as those at the beginning. At a time T3, the transfer of the block of data DI2 is completed. Then, under the control of and arbitration by the bus manager 500, the block of data DI1 is caused to be transferred at an even lower transfer rate. This substantially minimizes the occurrence of an inefficient, blank period during the transfer of the bus system 10. Thus, the power consumption of the bus system 10 that depends on its operating voltages varies in accordance with the transfer rates or operating voltages of the nodes 100-300, to thereby minimize the entire power consumption of the bus.

Figure 5:
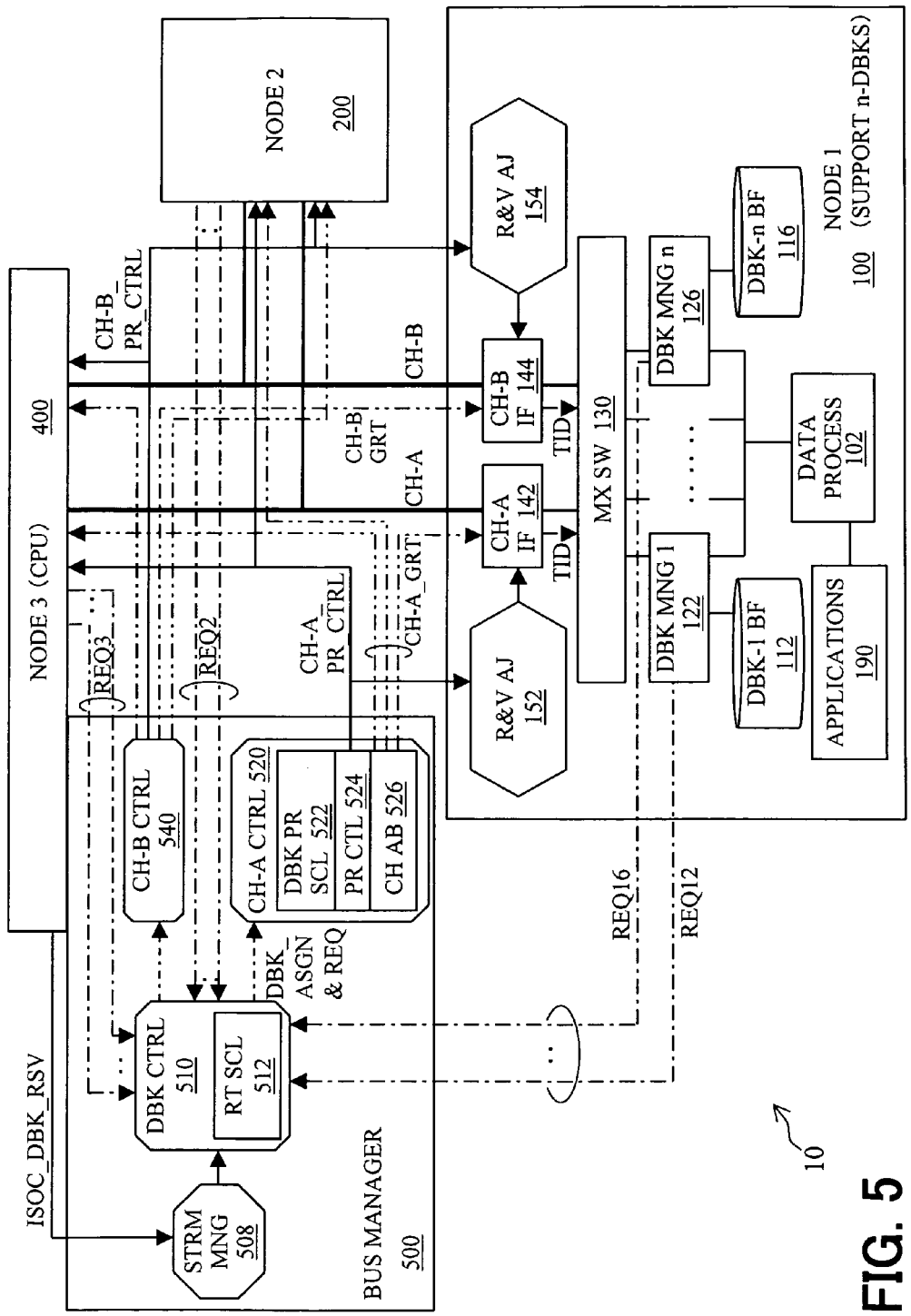
FIG. 5 shows the configuration of an exemplary bus system in accordance with an embodiment of the present invention.

FIG. 5 shows the configuration of an exemplary bus system 10 in accordance with an embodiment of the present invention. The bus system 10 includes two bus channels CH-A and CH-B, a node 1 indicated by 100, a node 2 indicated by 200, a node 3 as a CPU indicated by 400, and a bus manager indicated by 500. In this embodiment, the bus manager 500 and the CPU 400 are adapted to be capable of communicating directly with each other. For this purpose, for example, the bus manager 500 may be formed by one of function blocks of an LSI of the node 400 including the CPU, and the node 400 manages the functions of all the other nodes 100 and 200 and the node 400 per se. In this case, the CPU 400 registers a reservation of isochronous transfer of an isochronous block of data directly with the bus manager 500.

Each of the nodes 100, 200 and 400 is connected to the two bus channels CH-A and CH-B. The bus manager 500 receives a plurality of request signals REQ12 through REQ16 from the node 100 via a signal line, receives a plurality of request signals REQ2 from the node 200 via a signal line, and receives a plurality of request signals REQ3 from the node 400 via a signal line. In response to a pre-registered reservation of an isochronous transfer of a data block ISOC_DBK_RSV and to the request signals REQ12 through REQ16, and REQ2 and REQ3, the bus manager 500 prepares, during a scheduling period, a schedule or re-schedule of the transfer assignment so that a piece of data should be transferred at the possible minimum transfer rate during each transfer cycle. Thus, the bus manager 500 schedules a scheme of the transfer rates, the frequencies of the assignment, the sizes of continuously transferred pieces or units of data and the like for the isochronous blocks of data and/or the regular blocks of data on the bus channel. The bus manager 500 then determines, in accordance with the schedule, the assignment of the bus channel to the respective blocks of data in the period of time or transfer cycle, which period is determined in accordance with the sizes and the transfer rates of the continuously transferred units of data for the respective blocks of data. Then, during the period of time, the bus manager 500 provides parameter control signals CH-A_CTRL and CH-B_CTRL for the respective bus channels CH-A and CH-B to the corresponding nodes 100, 200 and 400 via the signal lines, to thereby adjust the operating rates and the operating voltages of the respective nodes. Further, the bus manager 500 issues, via the signal lines, grants CH-A_GRT and CH-B_GRT of use of the respective bus channels CH-A and CH-B for the blocks of data for transfer in the respective nodes 100, 200 and 400.

The node 100 includes: a data processor 102 connected to applications 190 for generating or utilizing blocks of data; a plurality, n, of data block managers 122-126 connected to the data processor 102 and having a plurality, n, of respective data block buffer memories 112-116; channel interfaces (CH-A IF and CH-B IF) 142 and 144 which interface with the two respective bus channels CH-A and CH-B to thereby transfer and receive the blocks of data; channel interface adjusters (R & V AJ) 152 and 154 for adjusting the respective transfer rates R and the respective operating voltages V of the channel interfaces 142 and 144; and a matrix switch (MX SW) 310 for selectively switching and coupling one of the two bus channels CH-A and CH-B to one of the data block managers 122-126 and also the other of the two bus channels CH-A and CH-B to another one of the data block managers 122-126. Thus, the data can be transferred simultaneously through the two bus channels. Each of the nodes 200 and 400 also has a configuration similar to that of the node 100.

The bus manager 500 includes: a stream manager (STRM MNG) 508 for receiving signals of reservations of isochronous data block transfers ISOC_DBK_RSV related to the transfer of isochronous blocks of data in the nodes 100, 200 and 400, via a signal line ISOC_DBK_RSV from the node 400, i.e. the CPU; a data block controller (DBL_CTRL) 510 connected to the stream manager 508; and channel controllers (CH-A CTRL and CH-B CTRL) 520 and 540 for receiving data block assignment and a notification of requests (DBK_ASGN&REQ) from the data block controller 510, and thereby generating parameter control signals (CH-A_PR_CTRL and CH-B_PR_CTRL) and issuing grants of use of the bus channels CH-A and CH-B (CH-A_GRT and CH-B_GRT). The data block controller 510 includes a transfer routing scheduler 512. The data block assignment describes the periods of time for the use of the bus channels CH-A and CH-B to be assigned to the blocks of data.

In accordance with the transfer requests REQ12, . . . REQ16, REQ2 and REQ3 received from the nodes 100, 200 and 400 and with the isochronous data block reservations ISOC_DBK_RSV received from the stream manager 508, the transfer routing scheduler 512 determines transfer routes for transferring the respective blocks of data, each route being composed of at least one bus channel. The isochronous data block reservation signal ISOC_DBK_RSV may contain the ID of a transferring source node or master node, an ID (TID) of a data block manager, an ID of a transferring destination node or slave node, the required rate of transfer, and the priority. The transfer request REQ for transferring the isochronous block of data may contain the type of a block of data (isochronous block), an ID of an isochronous data block transfer reservation, an ID of a transferring source node or master node, an ID (TID) of a data block manager, an ID of a transferring destination node or slave node, the required rate of transferring the block of data, the priority, and the like. The transfer request REQ for transferring the regular block of data may contain the type of a block of data (regular block), an ID of an isochronous data block transfer reservation, an ID of a transferring source node, an ID (TID) of a data block manager, an ID of a transferring destination node, the priority, and the like. The bus manager 510 determines the timings of transferring pieces of data of the block of data, the burst lengths of the respective pieces of transferred data, the transfer rates and the operating voltages for each block of data, and then provides the data block assignment and the notification of the requests, to the channel controller 520 or 540.

The channel controller 520 includes a data block parameter scheduler (DBK PR SCL) 522, a parameter controller (PR CTL) 524, and a channel arbiter (CH AB) 526 for a corresponding bus channel (CH-A). The channel controller 540 also has a configuration similar to that of the channel controller 520. In accordance with the data block assignment and the notification of requests (DBK_ASGN&REQ), the data block parameter scheduler 522 schedules a plan of the parameters of the bus channel CH-A for the corresponding block of data. In accordance with the schedule, the parameter controller 524 provides a channel parameter control signal CH-A_PR_CTRL to the channel interface adjusters 152 and 154 of the node 100 for transferring the block of data on the corresponding bus channel CH-A and also to the other node 200 or 400 for receiving the block of data. In accordance with the data block assignment and the request notification, the channel arbiter 526 provides a channel grant signal CH-A_GRT including the transfer ID (TID) of the granted data block manager (122-126) for transferring the block of data, to the corresponding nodes 100, 200 and 400.

In accordance with the channel parameter control signals CH-A_PR_CTRL and CH-B_PR_CTRL, the channel interface adjusters 152 and 154 adjust the operating rates and the operating voltages of the channel interfaces 142 and 144. The matrix switch 130 of the node 100 receives the transfer ID's (TID's) included in the channel grant signals CH-A_GRT and CH-B_GRT via the channel interfaces 142 and 144, and then provides them to the corresponding ones (e.g., 122) of the data block managers 122-126. The nodes 200 and 300 operate similarly.

The data block manager 122, which has received the channel grant (CH-A_GRT or CH-B_GRT) containing the transfer ID (TID), provides the block of data for transmission which is stored in the associated data block buffer memory 112, to a channel interface, e.g. the channel interface 142. The channel interface 142 transmits the block of data to the destination node at the adjusted operating rate and at the adjusted operating voltage. The channel interface 144 operates similarly.

When the node 100 is to receive the block of data via the bus channel CH-A or CH-B, the channel interface 142 or 144 similarly receives the block of data transferred by the source node (e.g., 200), via the channel CH-A or CH-B at the operating rate and the operating voltage adjusted by the channel controller 540.

Figure 6:
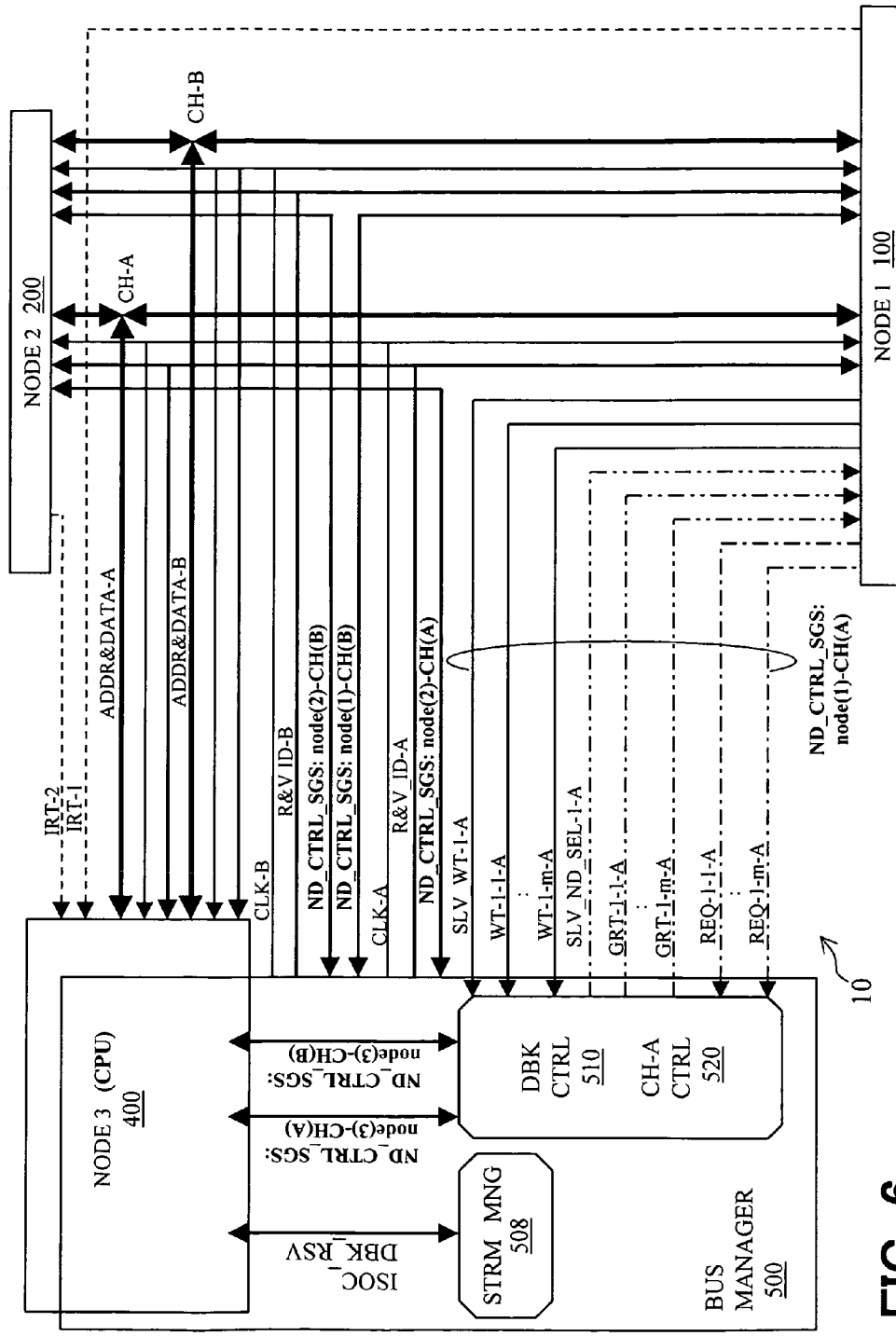
FIG. 6 shows an example of the details of the bus and the signal lines between the bus manager and the nodes in the configuration of FIG. 5.

FIG. 6 shows an example of the details of the bus, and the signal lines between the bus manager 500 and the nodes 100, 200 and 400 in the configuration of FIG. 5. The nodes 100, 200 and 400 are interconnected via the address and data lines ADDR&DATA-A and ADDR&DATA-B for the bus channels CH-A and CH-B. Clock signal lines CLK-A and CLK-B for the respective bus channels CH-A and CH-B, and operating rate and operating voltage setting information lines R&V_ID-A and R&V_ID-B from the bus manager 500 are connected to the nodes 100, 200 and 400. Interrupt signal lines IRT-1 and IRT-2 from the nodes 100 and 200 are connected to the node 300, i.e. the CPU. Node control signal lines ND_CTRL_SGS from the bus manager 500 is connected to the nodes 100, 200 and 400. The set of node control signal lines ND_CTRL_SGS connected to a corresponding node for a corresponding bus channel includes a slave wait signal line SLV_WT, a plurality of wait signal lines WT's, a slave node selection line SLV_ND_SEL, a plurality of bus channel grant lines GRT's, and a plurality of request lines REQ's.

Figure 7:
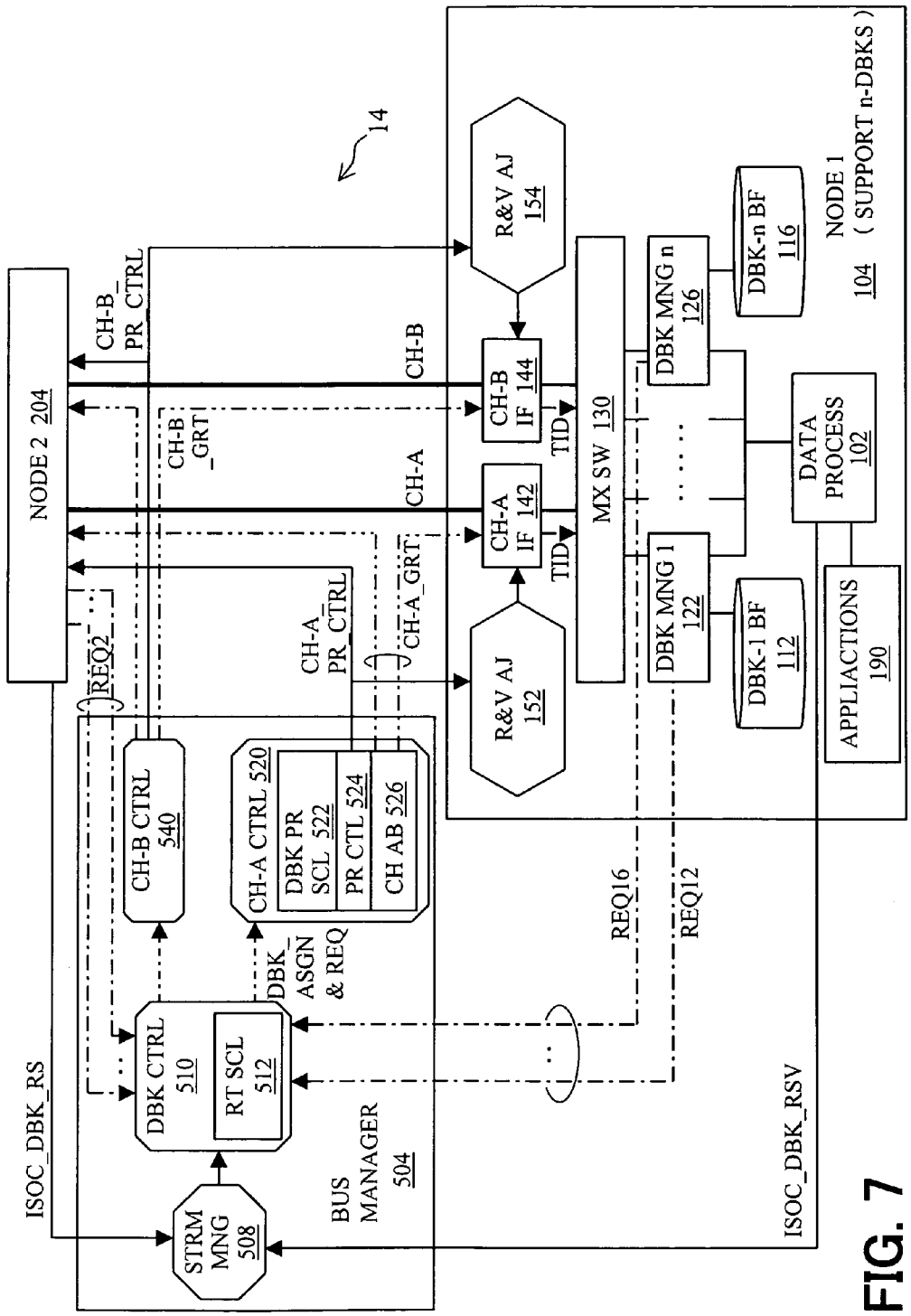
FIG. 7 shows the configuration of an exemplary bus system in accordance with another embodiment of the invention.

FIG. 7 shows the configuration of an exemplary bus system 14 in accordance with another embodiment of the invention. The bus system 14 includes a node 1 indicated by 104, a node 2 indicated by 204, and a bus manager 504. In this figure, another node 3 similar to the node 100 is not shown for simplicity. In this embodiment, the bus manager 504 is provided separately from the nodes. Each of the nodes 104 and 204 registers an isochronous data block reservation ISOC_DBK_RSV with the bus manager 504 through a dedicated signal line ISOC_DBK_RSV for isochronous data block reservation. The isochronous data block reservation ISOC_DBK_RSV of the node 104 is provided by the data processor 102 of the node 104 to the stream manager 508 of the bus manager 504. The isochronous data block reservation provided by the node 204 is similarly provided. The configurations of the nodes 104 and 204 and the bus manager 504 of the bus system 14 are similar to those of the node 100 and the bus manager 500 of the bus system 10 of FIG. 5, and hence are not described again.

Figure 8:
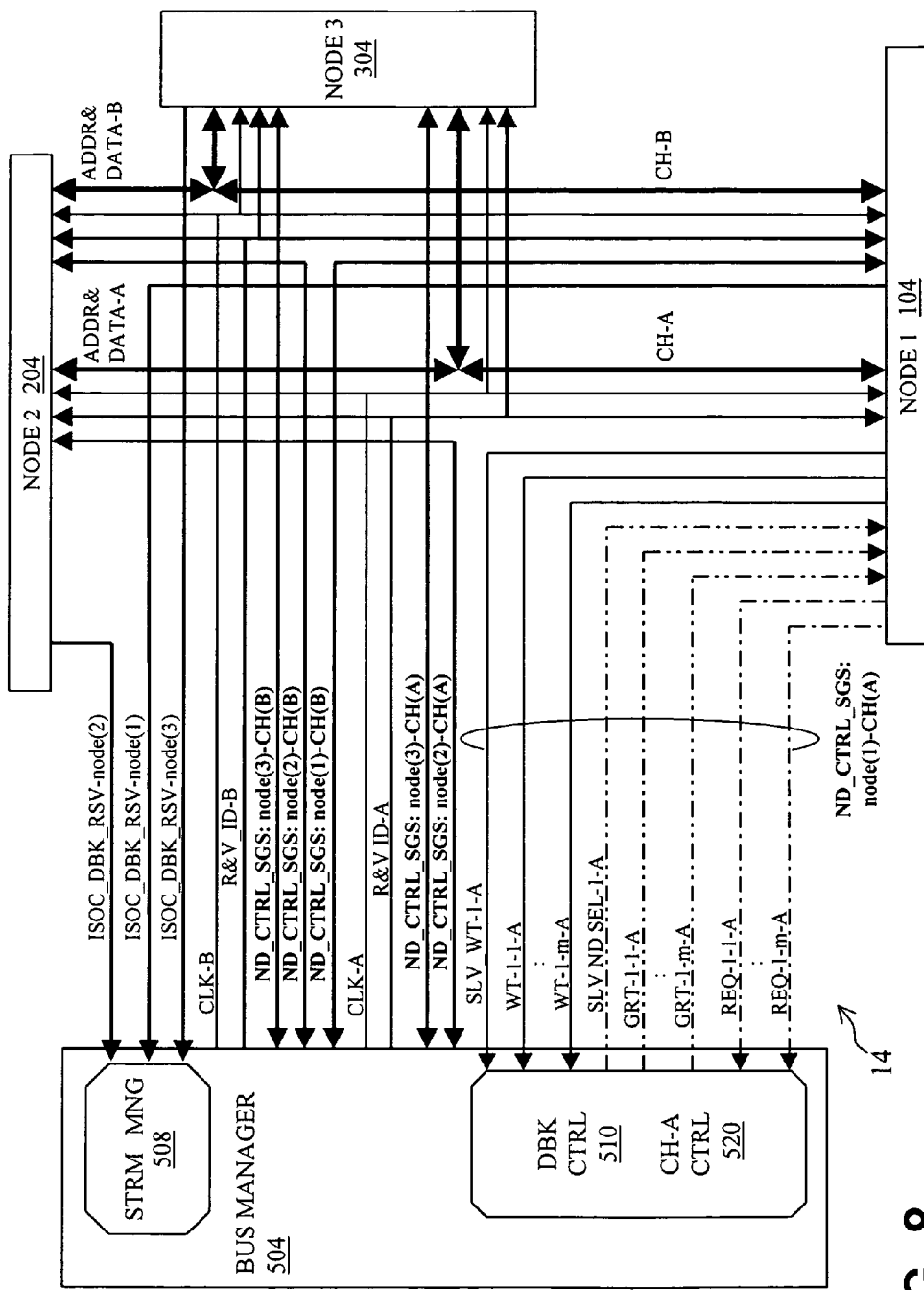
FIG. 8 shows an example of the details of the bus and the signal lines between the bus manager and the nodes and another node, in the configuration of FIG. 7.

FIG. 8 shows an example of the details of the bus, and the signal lines between the bus manager 504 and the nodes 104 and 204 and another node 304, in the configuration of FIG. 7. In this embodiment, dedicated signal lines ISOC_D-BK_RSV for the isochronous data block reservations from the nodes 104, 204 and 304 are connected to the bus manager 504. The other configuration is similar to that of the bus manager 500 and the node 100 of FIG. 6.

Figure 9:
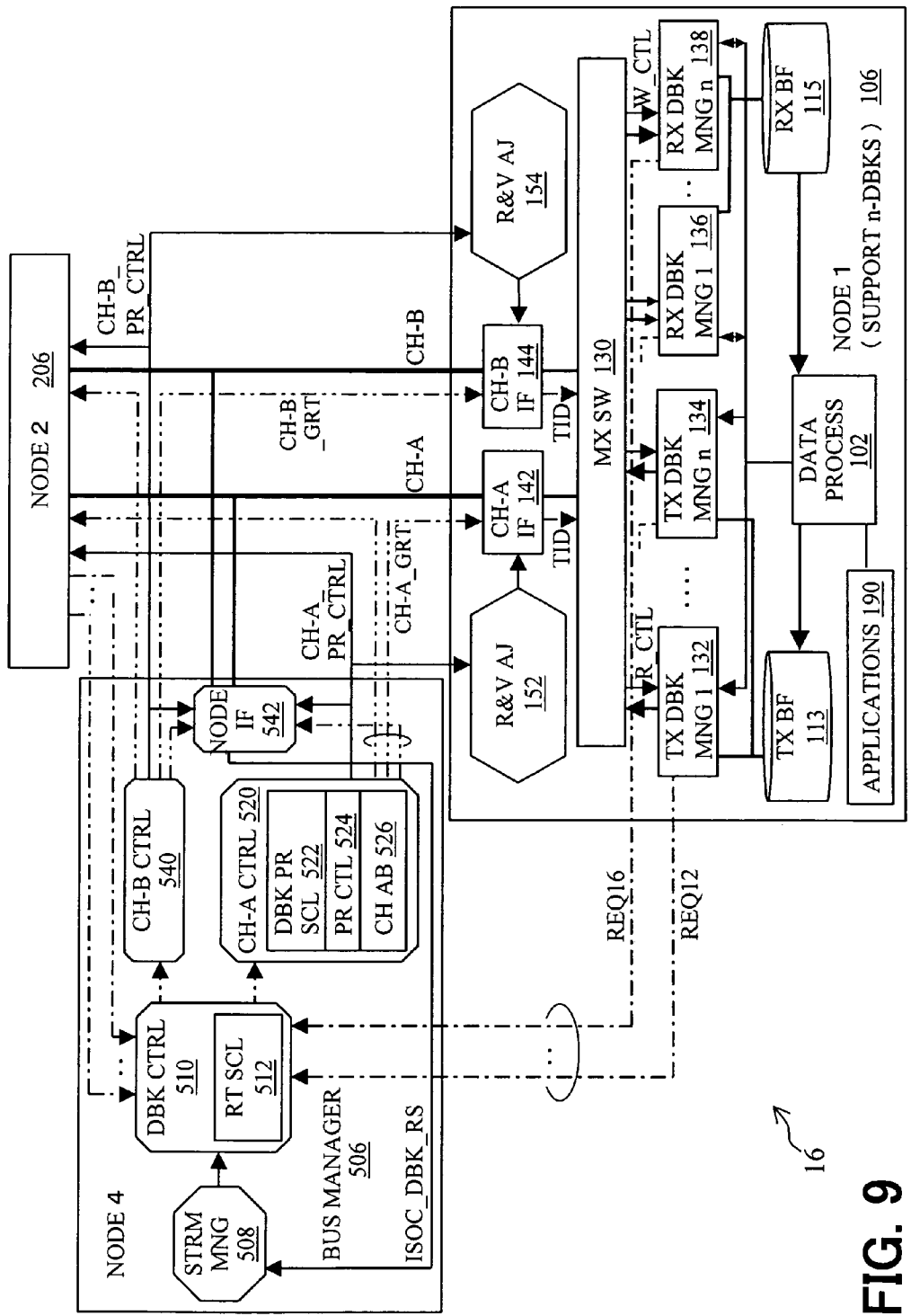
FIG. 9 shows the configuration of an exemplary bus system in accordance with a further-embodiment of the invention.

FIG. 9 shows the configuration of an exemplary bus system 16 in accordance with a further embodiment of the invention. The bus system 16 includes a node 1 indicated by 106, a node 2 indicated by 206, and a bus manager as a node 4 indicated by 506. In this embodiment, the bus manager 506 has the function of a node, and the nodes 106 and 206 can send an isochronous data block reservation, to the bus manager 506 via the bus channel CH-A or CH-B in a manner similar to the transfer of a regular block of data. Preferably, a predetermined dedicated priority is given to the block of data with indication of an isochronous data block reservation, so that the block of data is transferred from the nodes 106 and 206 to the bus manager 506 at the highest priority.

In FIG. 9, each of the node 106 and 206 has transmission data block managers and/or reception data block managers. In FIG. 9, the node 106 serves as a master and a slave, and includes transmission data block managers (TX DBK MNG's) 132, . . . , 134 serving as masters connected to a transmission buffer memory (TX BF) 113, and reception data block managers (RX DBK MNG's) 136, . . . , 138 serving as slaves connected to a reception buffer memory (RX BF) 115. The data processor 102 provides control signals to the transmission data block managers 132, . . . , 134, and sends and receives control signals to and from the reception data block managers 136, . . . , 138.

The matrix switch 130 provides read control signals R_CTL to the transmission data block managers 132, . . . , 134, and thereby reads the transmission data from the transmission buffer memory 113 via the transmission data block managers 132, . . . , 134. In addition, the matrix switch 130 provides write control signals W_CTL to the reception data block managers 136, . . . , 138, and thereby writes the received data into the reception buffer memory 115 via the reception data block managers 136, . . . , 138. The data processor 102 provides and stores the transmission data into the transmission buffer memory 113, and reads and processes the received data from the reception buffer memory 115. The transmission data block managers 132, . . . , 134 and the reception data block managers 136, . . . , 138 provide the requests REQ12, . . . , REQ16 to the data block controller 510 of the bus manager 512.

The node may include a set of one or more transmission data block managers alone that serve as masters connected to the associated transmission buffer memory. Alternatively, the node may include a set of one or more receiving data block managers alone that serve as slaves connected to the associated reception buffer memory.

The data processor 102 of the node 106 provides an isochronous data block reservation in the form of a regular block of data to the bus channel CH-A or CH-B via the transmission data block manager 132, . . . , 134. The stream manager 508 receives such isochronous data block reservations from the bus channels CH-A and CH-B via a node interface (IF) 542. In particular, when the node 106 has no transmission data block manager but has the reception data block managers 136, . . . , 138, the data processor 102 of the node 106 may provide, via the reception data block manager 136, . . . , 138 to the bus channel CH-A or CH-B, an isochronous data block reservation for a block of data to be received from another node in the form of a regular block of data.

Figure 10:
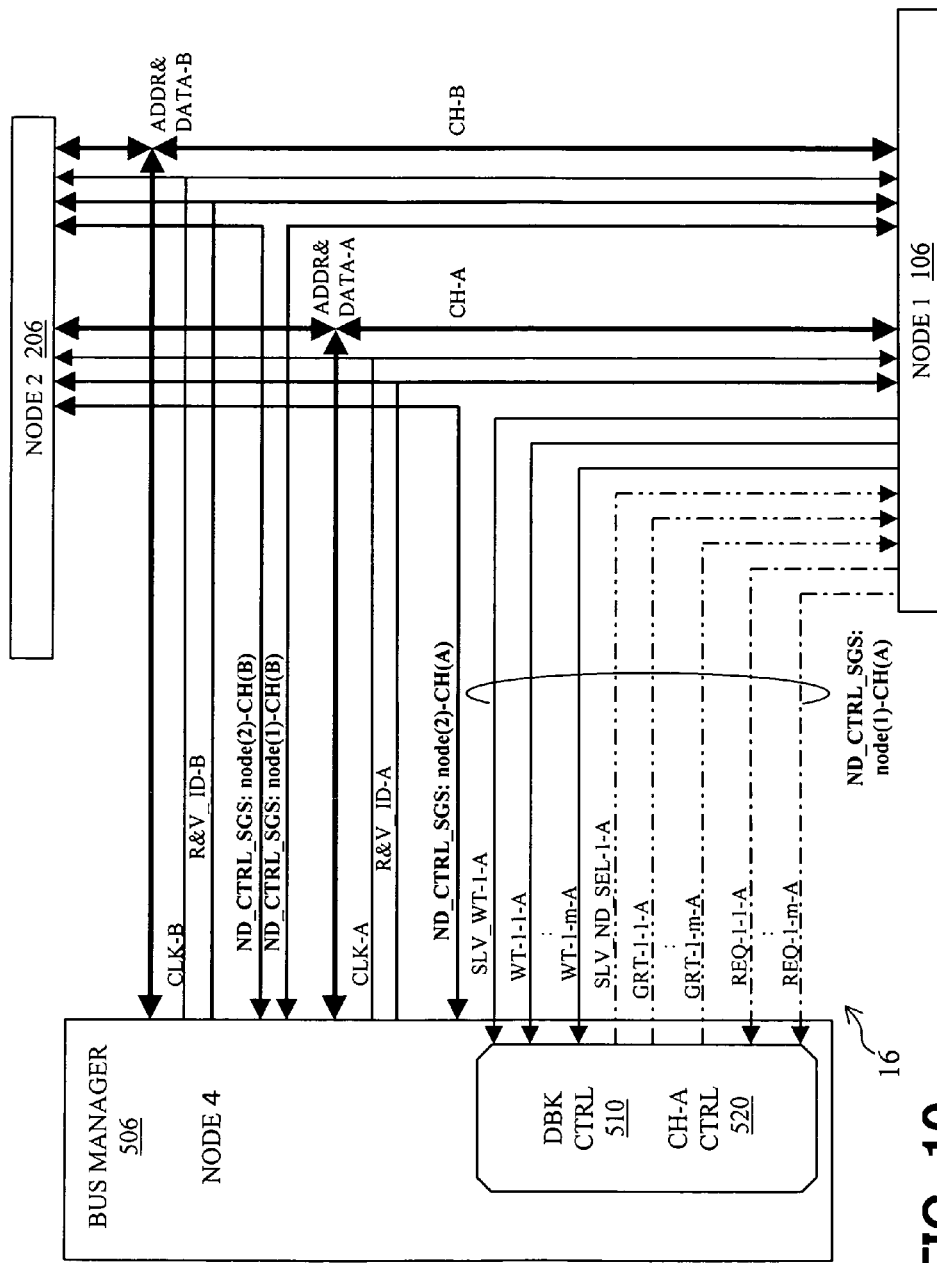
FIG. 10 shows an example of the details of the bus and the signal lines between the bus manager and the nodes in the configuration of FIG. 9.

FIG. 10 shows an example of the details of the bus, and the signal lines between the bus manager 504 and the nodes 106 and 206 in the configuration of FIG. 9. In this embodiment, no dedicated signal line is provided for an isochronous data block reservation.

Figure 11:
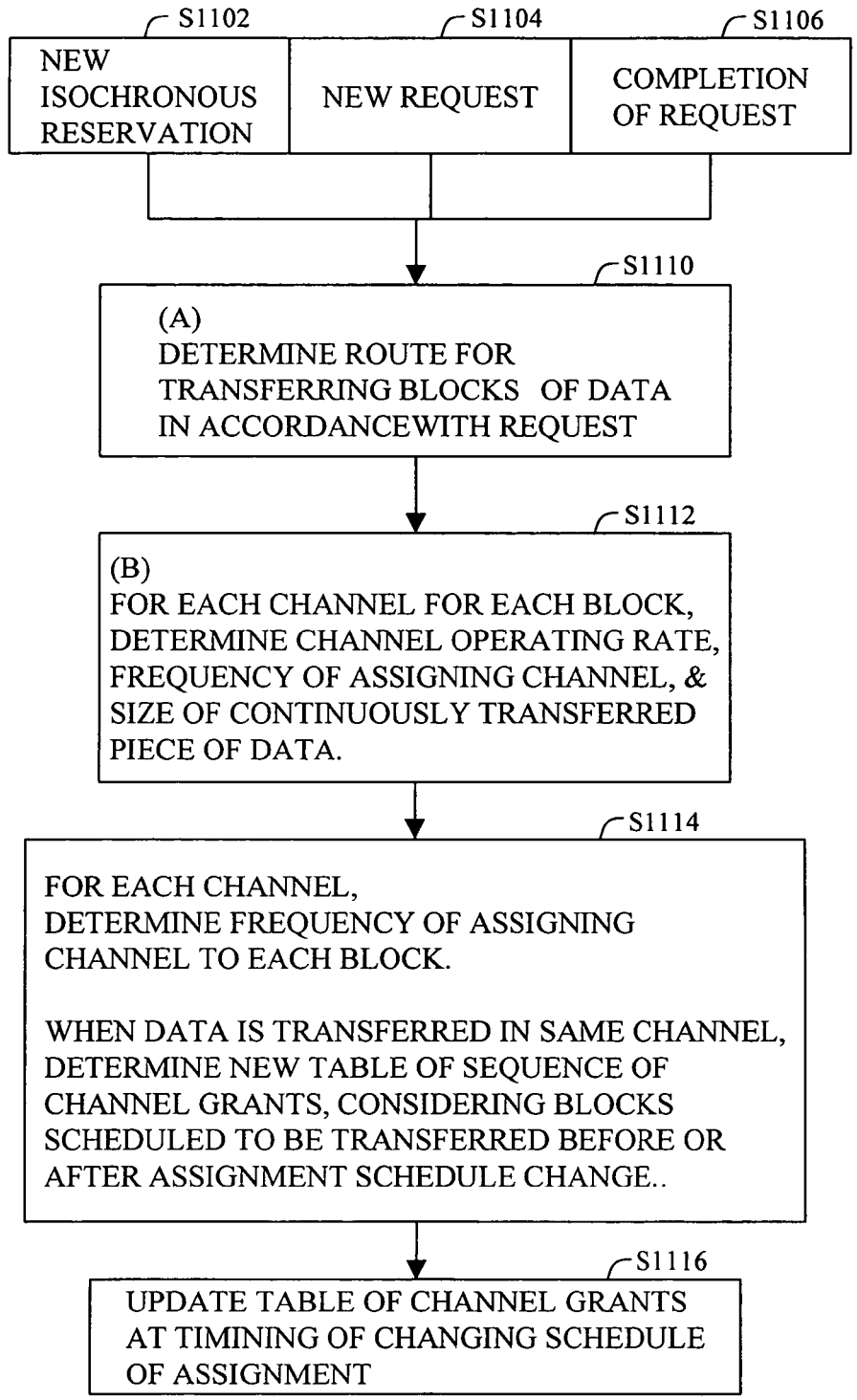
FIG. 11 is a flow diagram for scheduling and re-scheduling the assignment of the bus channel for transferring blocks of data, which is performed by the data block controller and the channel controllers of the bus managers of FIGS. 5-10.

FIG. 11 is a flow diagram for scheduling and re-scheduling the assignment of the bus channel for transferring blocks of data, which is performed by the data block controller 510 and the channel controllers 520 and 540 of the bus managers 500, 504 and 506 of FIGS. 5-10.

In response to one of the operations of Steps 1102, 1104 and 1106, the data block controller 510 performs Step 1110 and subsequent steps for scheduling and re-scheduling the assignment of the bus channel for the transfer. At Step 1102, the data block controller 510 receives a new reservation of an isochronous data block transfer, from the node 1, 2, 3 or 4 via the stream manager 508. At Step 1104, the data block controller 510 receives a new request by the node 1, 2, 3 or 4 for the transfer. In this case, such a new request may be considered as a regular block of data. At Step 1106, the request by the node 1, 2, 3 or 4 is completed.

At Step 1110 following any one of Steps 1102-1106, the data block controller 510 controls the route scheduler 512 to determine a transfer route for transferring the block of data in accordance with the request (A). Thus, the route scheduler 512 determines transfer routes for transferring respective requested blocks of data. When a plurality of bus channels are available to form a transfer route, the route scheduler 512 selects, from the bus channels, a combination of one or more bus channels so as to form such a transfer route. For this purpose, rules for simplifying the control are employed. Ones of these rules are, for example, that the bus channels should be assigned in a manner that the numbers of blocks of data assigned to the respective bus channels CH-A and CH-B should become as equalized to each other as possible, and that the bus channels should be assigned in a manner that isochronous data block transfers and regular data block transfers should be as segregated in the respective different bus channels as possible, i.e., should be less proportionately mixed or should not be mixed in each bus channel if possible. In addition, a rule for reducing the power consumption is employed. In this rule, for example, in accordance with the requirements of transfer rates of the respective blocks of data, different expected power consumptions are calculated for respective different patterns or combinations of the assignment of the blocks of data to the respective bus channels, and one of the patterns that provides the minimum power consumption is selected.

At Step 1112, the data block controller 510 determines the operating rates of the respective bus channels for the respective blocks of data, the frequencies of the channel assignment for the respective blocks of data (i.e., the number of times of transfer or pieces of data per transfer cycle, or the number of transfer cycles required per transfer of a piece of data, for each block of data), the sizes or amounts of the continuously transferred piece of data for the respective blocks of data, and the variable data burst lengths for the respective blocks of data, for the respective bus channels CH-A and CH-B (B).

FIGS. 16A and 16B show examples of a table of a sequence of issuing grants of the bus channel for transferring blocks of data. FIG. 16C shows an example of a list of identifiers of suspended transfers of blocks of data. In the tables of the sequence of issuing grants of the bus channel for the transfer, the numbers indicating the sequence of issuing grants are added before the respective identifiers of the respective blocks of data to be granted for transferring. The list of suspended transfers lists the identifiers of blocks of data, which have lower transfer priorities and hence the transfer of which is temporarily suspended when the traffic of the bus channel reaches the maximum allowable rate, and also lists the identifiers of blocks of data, the transfers of which are temporarily suspended by waits of transfer provided by the transmitting nodes or the receiving nodes.

Referring back to FIG. 11, at Step 1114, the data block controller 510 determines the frequencies of the assignment of the bus channels CH-A and CH-B to the respective blocks of data. Further, when another block of data is currently transferred in the same bus channel, the data block controller 510 determines a new table of a sequence of issuing bus channel grants for the transfer, factoring in the blocks of data which have been scheduled to be transferred before or after the assignment schedule change. The timing of changing the assignment schedule may be, for example, the timing of completion or termination of the bus channel grant for a currently transferred piece of data of a block of data when or after the new table of sequence of issuing bus channel grants for the transfer is determined. Considering the blocks of data which have been scheduled to be transferred, the new sequence of issuing bus channel grants for transfer is determined so as to avoid the unevenness of frequencies of the assignment of the bus channel to the respective blocks of data, for example, the unevenness between the new frequencies of the channel assignment and the previous frequencies of the channel assignment, immediately before and immediately after the assignment schedule change. For example, an identifier of a block of data to be transferred may be added to and deleted from the table of sequence of issuing bus channel grants for the transfer in accordance with the sequence in which the blocks of data have been transferred before the change.

At Step 1116, the data block controller 510 updates the table of sequence of issuing bus channel grants for the transfer, at the timing of the assignment schedule change. The channel controllers 520 and 530 generate respective control schedules of the channel parameters for the blocks of data, which parameters indicate the operating rates and the operating voltages of the bus channels CH-A and CH-B in the nodes 100 and 200, then send these channel parameters to the nodes 100 and 200, to assign the bus channels CH-A and CH-B to the nodes 100 and 200 for transferring the blocks of data.

Figure 12A:
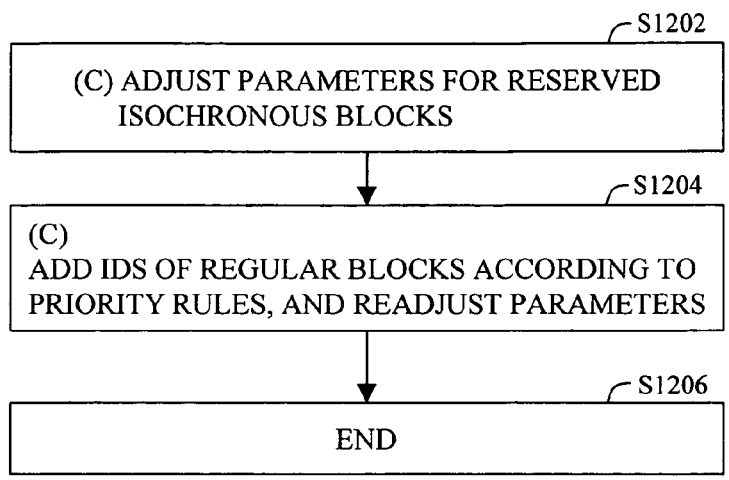
FIGS. 12A and 12B show examples of a flow diagram of determination of transfer parameters for transferring the blocks of data, which is performed at a step of FIG. 11.
Figure 12B:
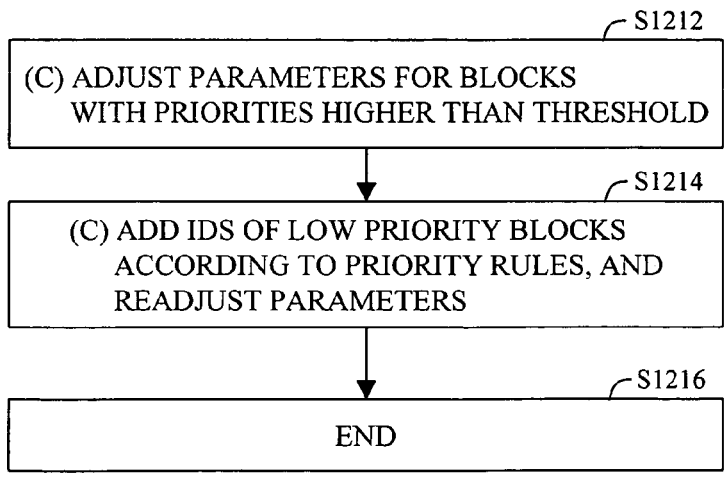

FIGS. 12A and 12B show examples of a flow diagram of the determination of the transfer parameters (B) for transferring the blocks of data, which is performed at Step 1112 of FIG. 11.

Referring to FIG. 12A, at Step 1202, the data block controller 510 adjusts the channel parameters for the reserved isochronous blocks of data (C). At Step 1204, the data block controller 510 adds identifiers of regular blocks of data to the table in accordance with predetermined priority rules, and then readjusts the parameters (C).

Referring to FIG. 12B, at Step 1212, the data block controller 510 adjusts the channel parameters for blocks of data having priorities higher than a predetermined threshold value (C). At Step 1214, the data block controller 510 adds, to the table, identifiers of blocks of data having lower priorities in accordance with the predetermined priority rules, and then readjusts the parameters (C).

The predetermined priority rules may be, for example, that the block of data with the highest priority should be transferred preferentially and precede the other blocks of data until the completion of the transfer of the block of data with the highest priority even if the requirements for the transfer of the other blocks of data are not satisfied, i.e., the transfer of the block of data with the highest priority should continue to be granted as long as the transfer is whatever possible; and that blocks of data having higher priorities should precede the other blocks of data, and an isochronous block of data should precede a non-isochronous block of data for two or more different blocks of data having the same priority. A further one of the rules may be that when a request for the transfer is not satisfied (e.g., when the traffic of the bus reaches the maximum allowable rate), an identifier of a block of data with the lowest priority is put into the list of suspended transfers, so that the transfer of the block of data with the lowest priority is suspended until the request for the transfer is satisfied, and the block of data with the lowest priority is transferred when the block of data with the lowest priority can be transferred. Alternatively, when a request for the transfer is not satisfied, the transfer of the block of data of this request may be suspended without putting an identifier of the block of data into the list of suspended transfers.

Figure 13:
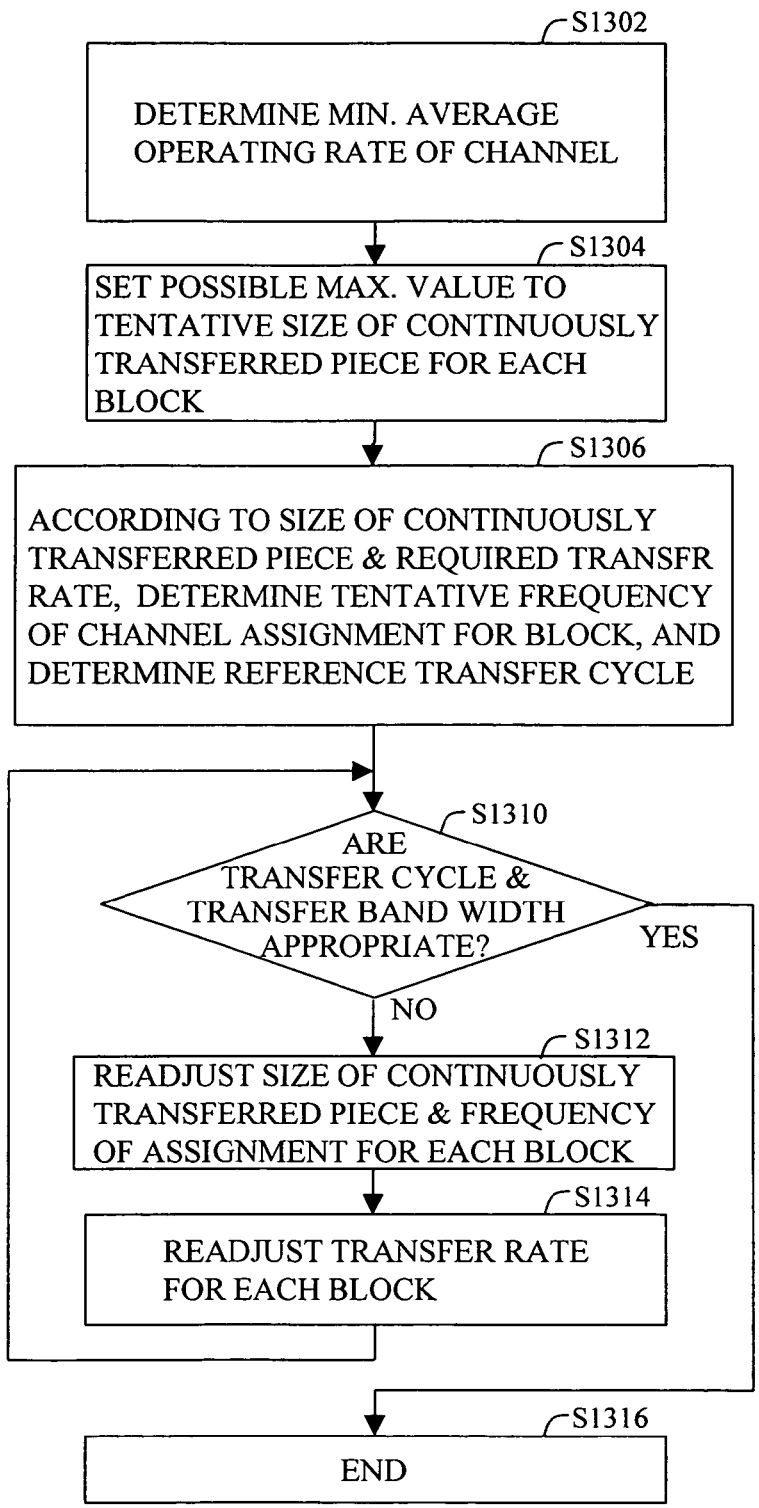
FIG. 13 shows an example of a flow diagram for adjusting the parameters, which is performed at steps of FIG. 12A and at steps of FIG. 12B.

FIG. 13 shows an example of a flow diagram for adjusting the parameters (C), which is performed at Steps 1202 and 1204 of FIG. 12A and at Steps 1212 and 1214 of FIG. 12B.

In adjusting the parameters, the same transfer rate is selected as an initial value for all blocks of data. The periods of time of assigning the bus channel are then increased for the blocks of data requiring higher transfer rates, and are reduced for the blocks of data requiring lower transfer rates. For this purpose, the sizes of the continuously transferred pieces of data and the frequencies of the channel assignment for the respective blocks of data are adjusted so that the periods of time of assigning the bus channel for the blocks of data become as equalized to each other as possible. If the total length of the periods of time for the transfer is insufficient, then the operating rate is adjusted.

At Step 1302, the data block controller 510 determines the minimum averaged operating rate of each bus channel, taking into consideration the required transfer rate of each block of data and the maximum operating rate available for each node. At Step 1304, the data block controller 510 sets the tentative size of a continuously transferred piece of data for each block of data to be the possible maximum value.

At Step 1306, in accordance with the size of a continuously transferred piece of data and with the required transfer rate, the data block controller 510 determines the tentative frequency of the bus channel assignment for each block of data, and then determines the reference transfer cycle, and the reference transfer interval if necessary.

At Step 1310, the data block controller 510 determines whether the time lengths of the transfer cycles of the respective blocks of data, and the unused space of the total transfer band width for the bus channel are appropriate. If it is determined that these lengths and space are appropriate, the procedure exits the subroutine of FIG. 13.

If it is determined at Step 1310 that these lengths and space are not appropriate, the data block controller 510 at Step 1312 readjusts the sizes of continuously transferred pieces of data and the frequencies of the bus channel assignment for the respective blocks of data. For this purpose, for example, the size of a continuously transferred piece of data is reduced for a block of data having a transfer cycle longer than the allowable length, and hence the frequency of the channel assignment is raised accordingly.

At Step 1314, the transfer rates are readjusted for the respective blocks of data. For this purpose, the transfer rate is raised for a block of data having a transfer cycle longer than the allowable length. If the tentative transfer band width is insufficient, the transfer rates are raised for one or more blocks of data to increase the tentative transfer band width. If the increased tentative transfer band width is still insufficient, a block of data may be re-assigned to another bus channel if possible, or the transfer of a block of data having a low priority may be suspended, or a block of data may be processed as an error of a request for impossible transfer and then cancelled. If there is an extra unused potion of the transfer band width, the transfer rate is reduced for a block of data having a low required transfer rate.

Figure 14:
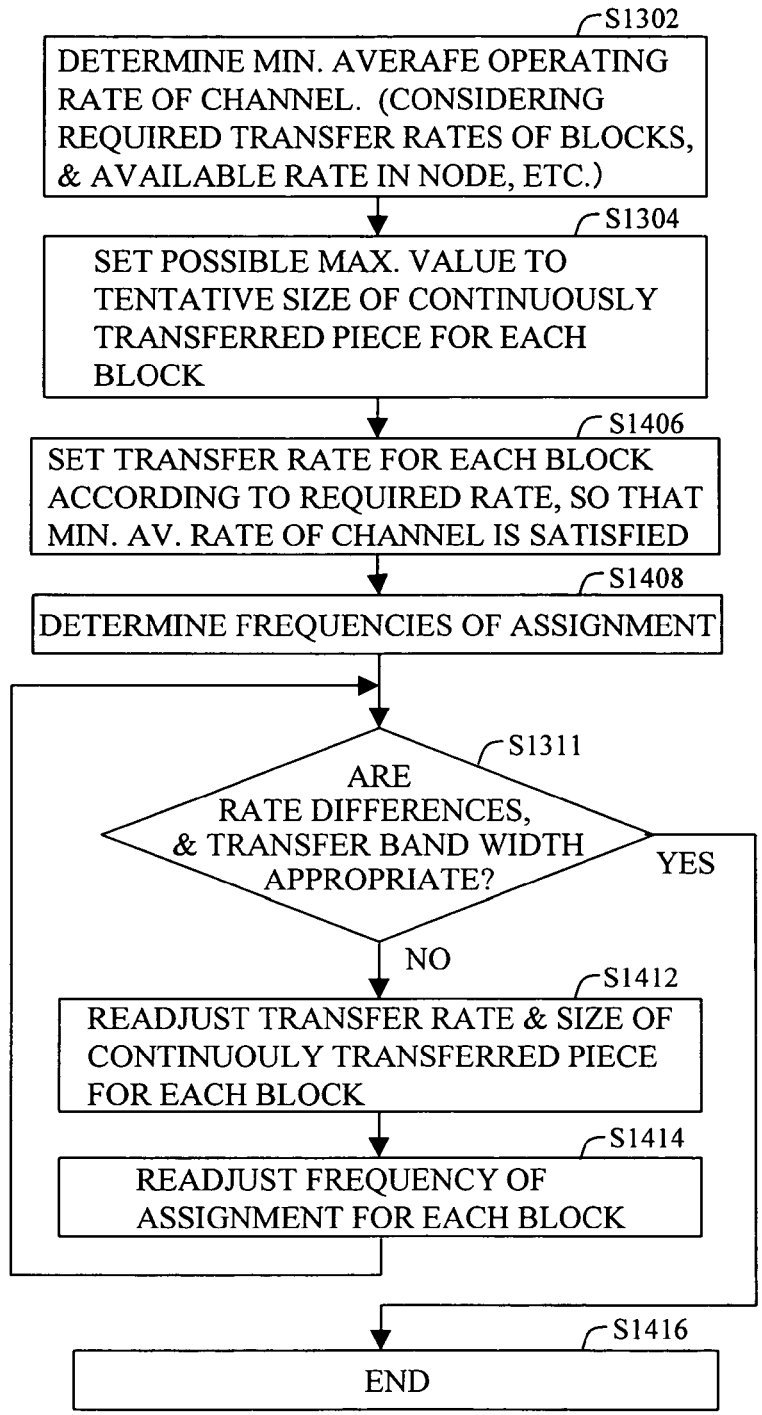
FIG. 14 shows another example of a flow diagram for adjusting the parameters performed at steps of FIG. 12A and at steps of FIG. 12B.

FIG. 14 shows another example of a flow diagram for adjusting the parameters (C) performed at Steps 1202 and 1204 of FIG. 12A and at Steps 1212 and 1214 of FIG. 12B.

In adjusting the parameters, the transfer rates are selected so that the periods of time of the bus channel assignment per transfer cycle for the respective blocks of data should become as equalized to each other as possible. For this purpose, a higher operating rate is set for a block of data having a higher required transfer rate. Next, while the periods of time of the bus channel assignment per transfer cycle for the respective blocks of data are adjusted to be as little changed as possible, the transfer operating rates and the sizes of the continuously transferred pieces of data are adjusted so that the differences among the transfer rates should be reduced for the respective blocks of data.

Steps 1302 and 1304 of FIG. 14 are similar to those of FIG. 13. At Step 1406, in accordance with the required transfer rates of the blocks of data, the data block controller 510 sets up the operating rates of the bus channel for transferring the respective blocks of data so that the minimum average rate of the bus channel is satisfied. At Step 1408, the data block controller 510 determines the frequencies of the bus channel assignment for the respective blocks of data.

At Step 1311 similar to Step 1310 of FIG. 14, the data block controller 510 determines whether the differences among the operating rates for transferring the respective blocks of data, and the unused space of the total transfer band width for the bus channel are appropriate. If it is determined at Step 1311 that these differences and space are appropriate, the procedure exits the subroutine of FIG. 13.

If it is determined at Step 1311 that these are not appropriate, the data block controller 510 at Step 1412 readjusts the transfer rates and the sizes of continuously transferred pieces of data for the respective blocks of data. At Step 1414, the data block controller 510 readjusts the frequencies of the bus channel assignment for the respective blocks of data.

Figure 15B:
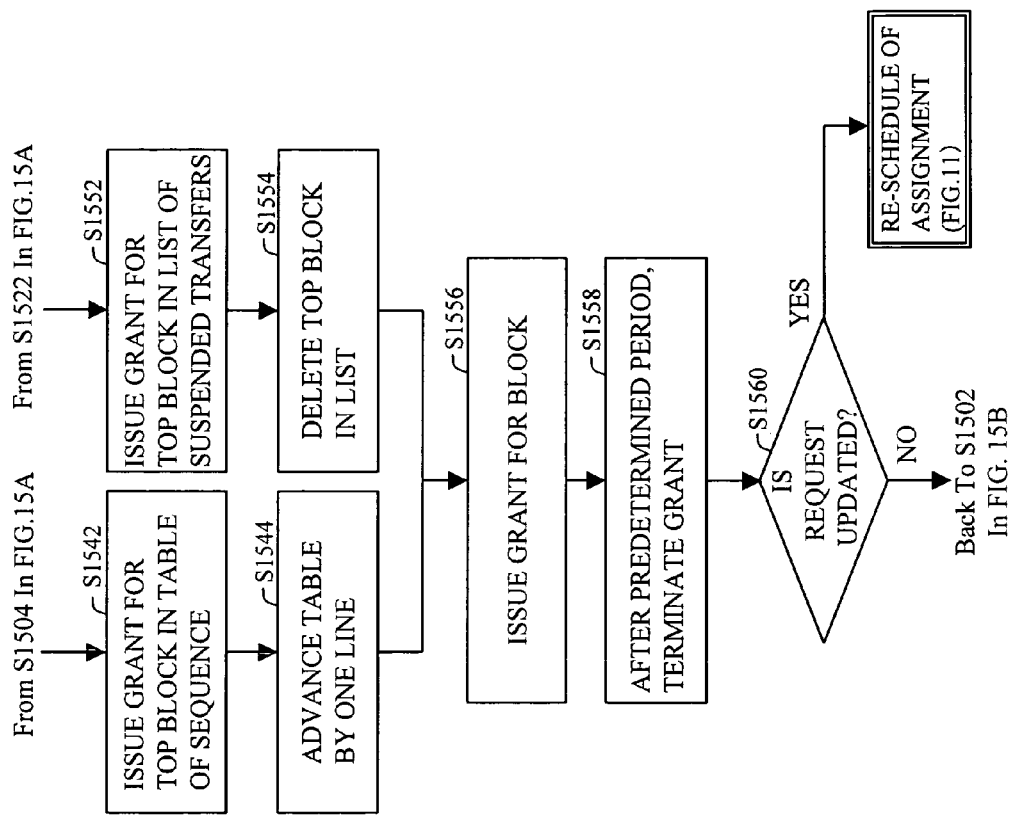

FIGS. 15A and 15B show a flow chart of processing for issuing grants of the bus channel GRT's to the data block managers 122-126 and 132-134, which is performed by the data block controller 510 of the bus manager 500 after the scheduling or re-scheduling of the assignment of the bus channel for transferring the blocks of data as shown in FIG. 11.

After the flow diagram of FIG. 11, i.e., after the completion of the scheduling or re-scheduling of the bus channel assignment, the data block controller 510 at Step 1502 determines whether a request for a wait of transfer (WT) has been provided by any of the data block managers of the nodes 1, 2, 3 and 4.

If it is determined that there is no request for a wait of transfer, the data block controller 510 at Step 1504 determines whether there is a list of suspended transfers of blocks of data. The list of suspended transfers is a list of identifiers of blocks of data the transfer of which should be suspended, as described above. If it is determined that there is no list of suspended transfers, then the procedure proceeds to Step 1542 of FIG. 15B. If it is determined that there is a list of suspended transfers, then the procedure proceeds to Step 1552 of FIG. 15B.

If it is determined at Step 1512 that there is a request for a wait of transfer, the data block controller 510 at Step 1502 determines whether there is a list of suspended transfers of blocks of data to be transferred. If it is determined that there is no list of suspended transfers, the data block controller 510 at Step 1522 determines whether there is a request for a wait of transfer for the block of data, the identifier of which is positioned at the top of the table of sequence of bus channel grants for transfer. If it is determined that there is no request for a wait of transfer of the top block of data in the table, then the procedure proceeds to Step 1542 of FIG. 15B.

If it is determined at Step 1522 that there is no request for a wait of transfer for the top block of data in the table, then at Step 1524, if there is the identifier of the block of data at the top of the table of sequence of bus channel grants for transfer does not appear in the list of suspended transfers, the data block controller 510 copies the identifier of the top block of data to the bottom of the list of suspended transfers, and then advances the table of sequence of bus channel grants for transfer by one line forward. At Step 1526, the data block controller 510 determines whether all of the identifiers of blocks of data in the table of sequence of bus channel grants for transfer also appear in the list of suspended transfers. If it is determined that all of the identifiers of blocks of data appear in the list of suspended transfers, the data block controller 510 at Step 1528 suspends the transfer of these blocks of data until the request for a wait of transfer is cancelled. After that, the procedure proceeds to Step 1520. At Step 1526, if it is determined that not all of the identifiers of blocks of data appear in the list of suspended transfers, the procedure returns to Step 1522.

If it is determined at Step 1512 that there is a list of suspended transfers, then the data block controller 510 at Step 1514 determines whether all of the blocks of data indicated in the list of suspended transfers are subject to the requests for waits of transfer. If it determined that all of them are subject to the requests for waits of transfer the procedure proceeds to Step 1522. If it is determined that not all of them are relevant to the requests for waits of transfer, then the procedure proceeds to Step 1520.

At Step 1520, the data block controller 510 checks the list of suspended transfers starting at the top block of data to determine whether the blocks of data are subject to the request for waits of transfer. If it determined that there is an identifier of a block of data which is not subject to a request for a wait of transfer, an identifier of such a block of data is moved to the top of the list of suspended transfers. After that, the procedure proceeds to Step 1522 of FIG. 15B.

Referring to FIG. 15B, at Step 1542, the data block controller 510 issues a grant GRT of the bus channel for the transfer of the block of data at the top of the table of sequence of bus channel grants for transfer. At Step 1544, the data block controller 510 advances the table of sequence of bus channel grants for transfer by one line forward.

On the other hand, at Step 1552, the data block controller 510 issues a grant of the bus channel for the block of data indicated at the top of the list of suspended transfers. At Step 1554, the data block controller 510 deletes the identifier of the block of data at the top of the list of suspended transfers.

At Step 1556 following Steps 1544 and 1554, the data block controller 510 issues a grant of bus channel GRT for the block of data to be transferred, to a corresponding node. At Step 1558, the data block controller 510 terminates the grant of the bus channel GRT after a predetermined period of time. Each of the channel controllers 520 and 540 receives data block assignment and a notification of requests (DBK_ASGN&REQ) from the data block controller 510, and then generates parameter control signal (CH-A_PR_C-TRL or CH-B_PR_CTRL) and the bus channel grant (CH-A_GRT or CH-B_GRT) for the bus channel CH-A or CH-B, during a corresponding transfer cycle P. At Step 1560, it is determined that any of the requests REQ's are updated, i.e., a previous request is terminated or a new request is generated. If it is determined that no request is updated, the procedure returns to Step 1502 of FIG. 15A. If it determined that the request REQ is updated, the re-scheduling of the assignment shown in FIG. 11 is performed.

FIGS. 17A-17E show an example of a time chart of generation of requests for transfer of blocks of data, waits of transfer, grants of the bus channel issued by the bus manager 500, and pieces of data transferred on the bus channel, and the change of the transfer rate on the bus channel, in the case that there is no change in reservations of transfers of isochronous blocks of data I1, I2 and I3 and that no transfer of a regular block of data is generated. In this case, it is assumed that the nodes 1 and 2 have already registered the reservations of the transfers of the isochronous blocks of data. It is also assumed that only one bus channel, e.g. CH-A, is used, and the bus channel is set up so as to operate at a constant transfer rate. It is further assumed that, during a grant of the bus channel G_I3 for the isochronous block of data I3, the data block manager for the block of data I3 of the node 2 transmits to the data block controller 510 a transfer wait signal W_I3 indicating the suspension of the transfer of the block of data I3.

In FIG. 17A, the node 1 provides requests for transfers (REQ_I1 and REQ_I2) of the isochronous blocks of data I1 and I2, to the bus manager 500. The node 2 provides a request for a transfer (REQ_I3) of the block of data I3, to the bus manager 500. The transfer request signals are maintained until the transfers of these blocks of data are completed.

In FIG. 17C, the data block controller 510 of the bus manager 500 schedules frequencies of assigning the bus channel at a ratio of 1:1:2 for the three requests for transfers REQ_I1, REQ_I2 and REQ_I3, then assigns the transfer cycle P1 of the bus channel to the block of data I1, then assigns the transfer cycles P2 and P4 to the block of data I3, and then assigns the transfer cycle P3 to the block of data I2. In accordance with the schedule of the transfer assignment, the channel arbiter 526 of the round-robin type issues grants of the bus channel, G_I1 and G_I2, to the node 1, and issues a grant of the bus channel, G_I3, to the node 2.

In FIG. 17B, while each of the data block managers (122-126, 132-134) of the node 1 is transferring the block of data I1 or I2, the subsequent piece of data may be read into buffer memory by means of a double buffering mechanism. In this case, unless each of the data block managers (122-126, 132-134) of the node 1 continuously transfer the data in the double buffer memories, they generate no wait of transfer. The node 2 generates a wait of transfer W_I3 at a plurality of times.

In this time chart, after the node 2 cancels the wait of transfer W_I3 for the block of data I3, the channel arbiter 526 issues a grant of the bus channel G_I3 for the block of data I3 in the next transfer cycle for issuing bus channel grants for transfer. Thus, the data block controller 510 sets up a relatively short transfer cycle P to reduce the time interposed between the successive grants of the bus channel for each block of data, and thereby adjusts the periods of time for transferring the respective blocks of data I1, I2 and I3 on the bus channel so as to become as equalized to each other and as short as possible.

In FIG. 17C, the time length of the transfer cycle P1 is determined depending on the amount of the block of data I1 so that the transfer rate R should be at constant. Then, in the transfer cycle P1, a grant of the bus channel G_I1 for the block data I1 is issued to the node 1. The time lengths of the transfer cycles P2 and P4 are set shorter than the transfer cycle P1 depending on the amount of the block of data I3, so that the transfer rate should become the constant R. Then, in each of the transfer cycles P2 and P4, a grant of the bus channel G_I3 for the block of data I3 is issued to the node 2. The time length of the transfer cycle P3 is set longer than the transfer cycles P1 and P2 depending on the amount of the block of data I2, so that the transfer rate should become the constant value R. Then, in the transfer cycle P3, a grant of the bus channel G_I2 for the block of data I2 is issued to the node 1. The wait of transfer W_I3 in the transfer cycle P7 is extended so as to terminate at the time T3 in the transfer cycle P8. Thus, the grant of the bus channel G_I3 scheduled for the block of data I3 is not issued to the node 2 in the transfer cycle P8, as indicated by a broken line square. Instead, a grant of the bus channel G_I1 is issued to the node 1 for the block of data I1 in the transfer cycle P8.

In the next transfer cycle P9, the wait of transfer W_I3 is canceled by the node 2, and hence a grant of the bus channel G_I3 is issued to the node 2 for the block of data I3. Thus, in the transfer cycles P8 and P9, the periods of time are interchanged for the grants of the bus channel G_I3 and G_I1 to be issued to the blocks of data I3 and I1. After that, a grant of the bus channel G_I2 is issued to the node 1 for the block of data I2.

FIG. 17D shows the transfer of the blocks of data I1, I2 and I3 on the bus channel. In accordance with the grants of the bus channel G_I1 through G_I3, the blocks of data I1, I2 and I3 are transferred to the node 3 by the nodes 1 and 2 (1-1→3 2-1→3, and 1-2→3).

In this case, as shown in FIG. 17E, there is no change in the reservations of transferring isochronous blocks of data, and no request for transfer of a regular block of data is generated. Thus, the transfer rate R is constant, and hence the operating voltage V is also constant.

FIGS. 18A-18E show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and I3 of the nodes 1 and 2, in the case that a reservation of transfer of an additional isochronous block of data I3 is generated during the transfers of the isochronous blocks of data I1 and I2 which have been reserved. In this case, it is assumed that the nodes 1 and 2 have already reserved the transfers of the two isochronous blocks of data I1 and I2. It is also assumed that only one bus channel is used, and the bus channel is set up so as to operate at a variable transfer rate. It is further assumed that, the data block manager (e.g., 122) for the block of data I1 in the node 1 sends a transfer wait signal W_I1 to the data block controller 510. When a new reservation of transfer of the isochronous block of data I3 is generated at a time T32 in the transfer cycle P4, and next when the transfer of the isochronous block of data I1 is completed at a time T34 in the transfer cycle P9, the data block controller 510 performs the re-scheduling of the transfer assignment. In the transfer cycle P9, the transfer of the block of data I1 is completed.

In FIG. 18A, at first, in the transfer cycles P1 through P4, the node 1 provides, to the data block controller 510 of the bus manager 500, requests for transfer REQ_I1 and REQ_I2 of the isochronous blocks of data I1 and I2. At a time T32 in the transfer cycle P4, the node 2 generates a new reservation of transfer of the isochronous block of data I3. In the transfer cycle P5, the node 2 provides, to the data block controller 510, a request of transfer REQ_I3 of the block of data I3. Thus, the data block controller 510 performs the re-scheduling of the assignment of bus channel grants for transfer in accordance with the flow diagram of FIG. 11. At the time T33 indicative of the end of the cycle P5, the data block controller 510 changes the control of transferring the blocks of data. In the transfer cycle P9, the node 1 has completed the transfer of the block of data I1, and hence stops the request for transfer REQ_I1. Thus, at the time T34, the data block controller 510 performs the re-scheduling of the assignment of grants of the bus channel for transfer, and thereby changes the control of the transfer.

In FIG. 18C, the data block controller 510 schedules frequencies of assigning the bus channel at a ratio of 1:1 for the two requests for transfers REQ_I1 and REQ_I2, then assigns the transfer cycle P1 to the block of data I1, and then assigns the transfer P2 to the block of data I3.

In FIG. 18B, the data block manager (122-126, 132-134, 136-138) of the node 1 generates waits of transfer W_I1. Each time after the node 1 cancels the wait of transfer W_I1 of the block of data I1, the channel arbiter 526 issues a grant of the transfer of the block of data I1 in the subsequent transfer cycle for assigning a grant for the transfer.

In FIG. 18C, the time length of the transfer cycle P1 is set up depending on the amount of the block of data I1, so that the transfer rate R should be reduced. In the cycle P1, a grant of the bus channel G_I1 for the block of data I1 is issued to the node 1. The time length of the transfer cycle P2 is set to be equal to that of the cycle P1. In the cycle P2, a grant of the bus channel G_I2 for the block of data I2 is issued to the node 1. The transfer cycles P3 through P5 are set similarly.

In FIG. 18E, the transfer operating rate or the operating voltage is determined or changed by the channel controller 520 depending on the amount of the transferred piece of data for the one cycle in accordance with the schedule of the transfer assignment, so that a piece of the data for one transfer cycle ca be transferred within the one transfer cycle.

At the time T33, in accordance with the re-schedule of the assignment, the control of the transfer is changed so that the time length of one transfer cycle is reduced, in order to accommodate the transfer of the three isochronous blocks of data. In the transfer cycle P6, the channel controller 520 raises the transfer operating rate R, and the channel arbiter 526 issues a grant of the bus channel G_I3 to the node 2 for the block of data U3. In the transfer cycle P7, the channel controller 520 sets the transfer operating rate higher than that in the transfer cycle P1 and lower than that in the transfer cycle P6. Then, the channel arbiter 526 issues a grant of the bus channel G_I1 to the node 1 for a period of time required only for transmitting half the amount of a piece of data of the block of data I1 that has been transferred in the transfer cycle P1, in order to reduce the time delay of the transfer of the block of data I1. In the cycle P8, the channel arbiter 526 issues a grant of the bus channel G_I2 to the node 1 for the block of data I2 in order to prevent a time delay in the transfer of the block of data I2. In the transfer cycle P9, the channel arbiter 526 issues a grant of the bus channel G_I1 to the node 1 for a period of time required for transferring the a remaining half of the piece of data which has not been transmitted in the transfer cycle P7 for the block of data I1.

At the time T34, the transfer of the block of data I1 is completed. Thus, the assignment of the bus channel is re-scheduled. Accordingly, in the transfer cycles P10 and P11, the transfer operating rate is adjusted depending on the amount of the data, so that the blocks of data I3 and I2 are alternately transferred in equal periods of time.

FIG. 18D shows the transfer of the blocks of data I1, I2 and I3 on the bus channel. The nodes 1 and 2 transfer the blocks of data I1, I2 and I3 to the node 3 in accordance with the grants of the bus channel G_I1 through G_I3.

In the way as described above, in FIGS. 18A-18E, the transfer operating rate is adjusted depending on the amount of the data to be transferred. Thus, the control of the transfer is performed so that a blank period of time is reduced as much as possible in each cycle.

FIGS. 19A-19E show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and N3 of the nodes 1 and 2, in the case that a request for a transfer of a further regular block of data N3 is generated during the transfers of the isochronous blocks of data I1 and I2 which have been reserved. In this case, it is assumed that the reservations of transfers of the isochronous blocks of data have been already registered with the bus manager 500. It is also assumed that only one bus channel is used, and the bus channel is set up so as to operate at a variable transfer rate.

In this case, in the transfer cycles P1-P5, the bus manager 500 and the nodes 1 and 2 operate similarly to those in FIGS. 18A-18E. At a time T43 of the transfer cycle P5, the node 2 provides a request for transfer, REQ_N3, of the regular block of data N3. Thus, at a time T44, the data block controller 510 performs the re-scheduling of the assignment of bus channel grants for transfer in accordance with the flow chart of FIG. 11. At the time T44 indicative of the end of the cycle P5, the data block controller 510 changes the control of transferring the blocks of data in the next transfer cycle P6. In the cycle P6, the transfer of the regular block of data N3 is completed. Thus, the data block controller 510 performs the re-scheduling of the assignment of bus channel grants for transfer at the time T45. At a time T46 indicative of the end of the cycle P6, the data block controller 510 changes the control of transferring the blocks of data in the next transfer cycle P7. In the transfer cycle P9, the node 1 has completed the transfer of the block of data I1, and hence stops the request for transfer REQ_I1. Thus, at a time T47 in the transfer cycle P9, the data block controller 510 performs the re-scheduling of the assignment of bus channel grants for transfer, and thereby changes the control of transferring the block of data.

In the cycle P6, the channel controller 520 raises the transfer operating rate, and the channel arbiter 526 issues a grant of the bus channel G_N3 to the node 2 for the block of data N3. In the cycle P6, the node 2 has completed the transfer of the regular block of data N3, and hence stops the request for transfer REQ_N3. In the cycles P7 through P9, the bus manager 500 and the nodes 1 and 2 operate similarly to those in FIGS. 18A-18E.

At the time T47, the transfer of the block of data I1 is completed. Thus, the re-scheduling of the assignment is performed so that the transfer operating rate is adjusted depending on the amount of the data after the transfer cycle P10. Then, only the block of data I2 is transferred at a transfer rate of approximately one half of the transfer rate in the cycle P2.

FIGS. 20A-20E are a modification of the time chart of FIGS. 17A-17E, and show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and I3 of the nodes 1 and 2, in the case that a wait of transfer W_I1 of the block of data I1 in the node 1 remains in a cycle during which the block of data I1 should be transferred. In this case, it is assumed that the node 2 generates no wait of transfer of the block of data I3. The operations of the bus manager 500 and the nodes 1 and 2 in FIGS. 20A-20E are essentially similar to those in FIGS. 17A-17E.

In the transfer cycles P2 through P5, the node 1 generates a wait of transfer W_I1 of the block of data I1. At the start of the transfer cycle P5, the wait of transfer W_I1 is continued. Thus, the channel arbiter 526 suspends the grant of the bus channel to be issued to the node 1 for the block of data I1, but instead issues a grant of the bus channel G_I3 to the node 2 for the block of data I3. In the transfer cycle P5, the node 1 cancels the wait of transfer W_I1. In the cycle P6, the node 1 does not generates a wait of transfer W_I1, and hence the channel arbiter 526 issues a grant of the bus channel G_I1 to the node 1 for the block of data I1. Thus, in the transfer cycles P5 and P6, the periods of time are interchanged for the grants of the bus channel G_I3 and G_I1 to be issued for the blocks of data I3 and I1. After that, a grant of the bus channel G_I2 is issued to the node 1 for the block of data I2.

FIGS. 21A-21E are a modification of the time chart of FIGS. 20A-20E, and show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and I3 of the nodes 1 and 2, in the case that waits of transfer W_I1 and W_I3 of the blocks of data I1 and I3 of the nodes 1 and 2 remain in transfer cycles during which the blocks of data I1 and I3 should be transferred. The operations of the bus manager 500 and the nodes 1 and 2 in FIGS. 21A-21E are essentially similar to those in FIGS. 17A-17E.

In the transfer cycles P2 through P5, the node 1 generates a wait of transfer W_I1 for the block of data I1. Immediately before the start of each of the transfer cycles P3, P5, P8 and P10, the node 1 generates a wait of transfer W_I1 of the block of data I1. At the start of the transfer cycle P5, the waits of transfer W_I1 and W_I3 continue, and hence the channel arbiter 526 suspends the grant of the bus channel to be issued to the node 1 for the block of data I1, but instead issues a grant of the bus channel G_I2 to the node 1 for the block of data I2. In the transfer cycle P6, the nodes 1 and 2 generate no wait of transfer, and hence the channel arbiter 526 issues a grant of the bus channel G_I1 to the node 1 for the block of data I1, the transfer of which has been delayed for a longer time than the transfer of the block of data I3 of the node 2. At the start of the transfer cycle P7, the node 2 generates no wait of transfer, and hence the channel arbiter 526 issues a grant of the bus channel G_I3 to the node 2 for the block of data I3, the transfer of which has been delayed.

At the start of the transfer cycle P8, the node 2 generates a wait of transfer W_I3 for the block of data I3. Thus, the channel arbiter 526 suspends the bus channel grant to be issued to the node 2 for the block of data I3, but instead issues a grant of the bus channel G_I2 to the node 1 for the block of data I2.

In the transfer cycle P9, the node 2 generates no wait of transfer. Thus, the channel arbiter 526 issues a grant of the bus channel G_I3 to the node 2 for the block of data I3, the transfer of which has been delayed for a longer time than the transfer of the block of data I1 of the node 1. At the start of the cycle P10, the node 2 generates a wait of transfer W_I3, and hence the channel arbiter 526 issues a grant of the bus channel G_I1 for the block of data I1 of the node 1. At the start of the cycle P11, the node 2 generate no wait of transfer, and hence the channel arbiter 526 issues a grant of the bus channel G_I3 to the node 2 for the block of data I3, the transfer of which has been delayed for a longer time than the transfer of the block of data I1 of the node 1.

FIGS. 22A-22E are a modification of the time chart of FIGS. 20A-20E, and show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and I3 of the nodes 1 and 2, in the case that a wait of transfer W_I1 of the block of data I1 of the node 1 remains in a cycle where the block of data I1 should be transferred. In this case, it is assumed that the node 2 generates no wait of transfer of the block of data I3. The operations of the bus manager 500 and the nodes 1 and 2 in FIGS. 22A-22E are essentially similar to those in FIGS. 17A-17E.

In the transfer cycles P2-P6, the node 1 generates a wait of transfer W_I1 for the block of data I1. At the start of the cycle P5, the wait of transfer W_I1 is continued, and hence the channel arbiter 526 suspends the grant of the bus channel to be issued to the node 1 for the block of data I1, but instead issues a grant of the bus channel G_I3 to the node 2 for the block of data I3. At the start of the transfer cycle P6, the wait of transfer W_I1 continues, and hence the channel arbiter 526 re-suspends the grant of the bus channel to be issued to the node 1 for the block of data I1, but instead issues a grant of the bus channel G_I2 to the node 1 for the block of data I2.

At the start of the transfer cycle P7, the node 1 generates no wait of transfer, and hence the channel arbiter 526 issues a grant of the bus channel G_I1 to the node 1 for the block of data I1. As a result, in the transfer cycles P5-P7, the period of time for transferring the block of data I2 of the node 1 and the period of time for transferring the block of data I3 of the node 2 appear irregularly. After that, a grant of the bus channel G_I3 is issued to the node 2 for the block of data I3.

FIGS. 23A-23E are a modification of the time chart of FIGS. 21A-21E, and show an example of a time chart of generation of requests for transfer of blocks of data, waits of transfer, grants of the bus channel issued by the bus manager 500, and pieces of data transferred on the bus channel, and the change of the transfer rate on the bus channel, for the blocks of data I1, I2 and I3 of the nodes 1 and 2, in the case that a wait of transfer W_I1 of the block of data I1 of the node 1 remains in two successive cycles where the block of data I1 should be transferred and that another wait of transfer W_I3 of the other block of data I3 of the other node 2 remains even in a transfer cycle where the other block of data I3 should be transferred. The operations of the bus manager 500 and the nodes 1 and 2 in FIGS. 23A-23E are essentially similar to those in FIGS. 17A-17E.

In the transfer cycles P2-P5, the node 1 generates a wait of transfer W_I1 of the block of data I1. Before the start of each of the transfer cycles P3, P5, P8 and P10, the node 1 generates a wait of transfer W_I1 of the block of data I1. At the start of the cycle PS, the node 1 continues to generate the wait of transfer W_I1 of the block of data I1, and the node 2 generates a wait of transfer W_I3 of the block of data I3. Thus, the channel arbiter 526 suspends the grants of the bus channel for the blocks of data I1 and I3 to be issued to the nodes 1 and 2, but instead issues a grant of the bus channel G_I2 to the node 1 for the block of data I2. At the start of the cycle P6, the node 1 continues to generate the wait of transfer W_I1 of the block of data I1, and the node 2 generates no wait of transfer of the block of data I3. Thus, the channel arbiter 526 re-suspends the grant of the bus channel to be issued to the node 1 for the block of data I1, and issues a grant of the bus channel G_I3 to the node 2 for the block of data I3.

At the start of the transfer cycle P7, the node 1 generates no wait of transfer of the block of data I1, and hence the channel arbiter 526 issues a grant of the bus channel G_I1 to the node 1 for the block of data I1, the transfer of which has been delayed, and suspends the grant of the bus channel to be issued to the node 1 for the block of data I2. After that, in the transfer cycle P8, a channel grant G_I3 is issued to the node 2 for the block of data I3.

Figure 24:
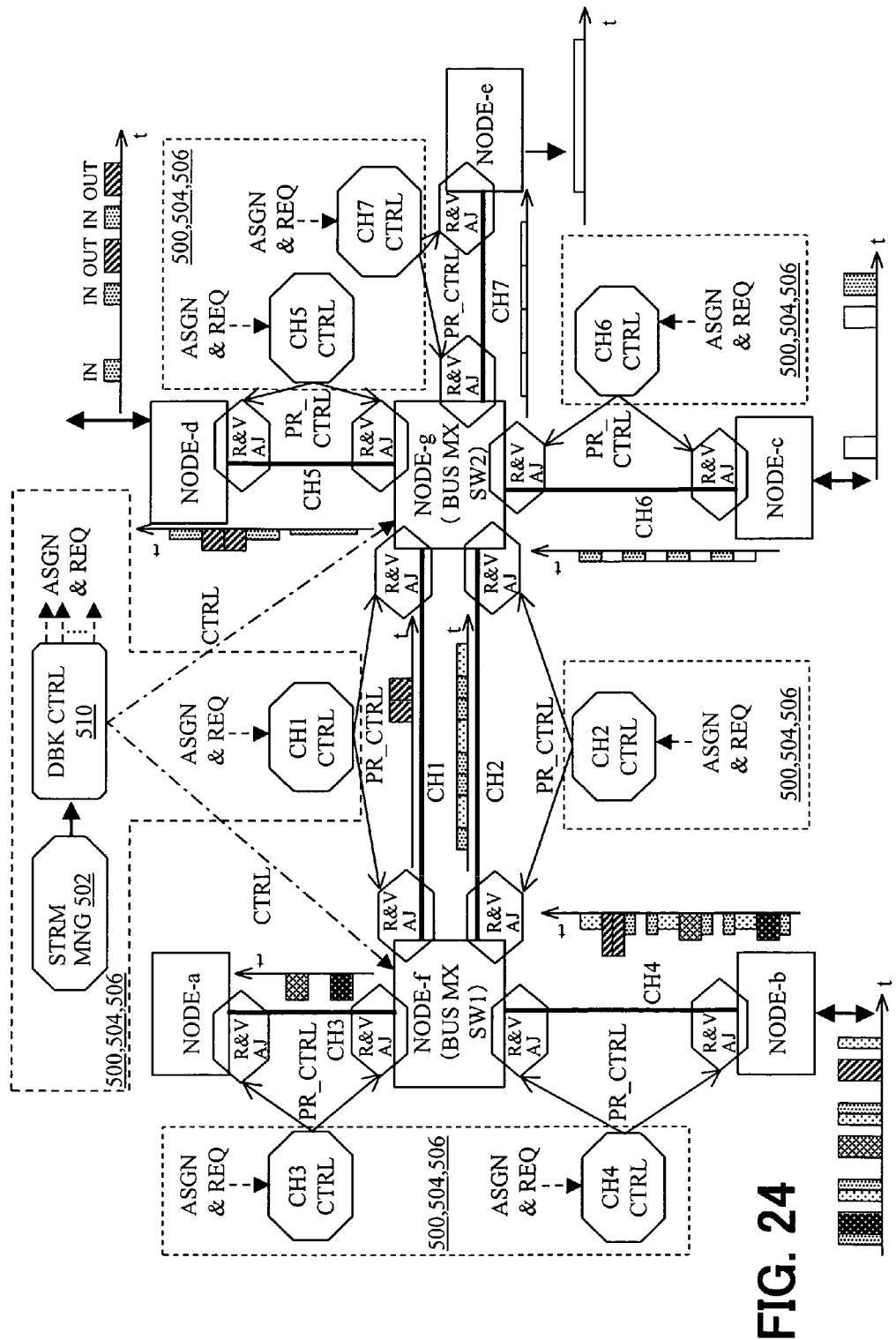
FIG. 24 shows the configuration of a bus system in the multilayer configuration in accordance with a further embodiment of the invention.

FIG. 24 shows the configuration of a bus system in the multilayer configuration in accordance with a further embodiment of the invention. This figure illustrates the inputs and outputs of blocks of data in different nodes and the data flows in different bus channels.

The bus manager 500, 504 or 506 includes channel controllers CH1 CTRL through CH7 CTRL for respective channels CH1 through CH7. The channel controllers CH1 CTRL through CH7 CTRL are connected to the data block controller (DBK CTRL) 510. The data block controller 510 provides data block assignments and notifications of requests ASGN & REQ to the respective channel controllers CH1 CTRL through CH7 CTRL. The channel controllers CH1 CTRL through CH7 CTRL provide parameter control signals PR_CTL's to respective channel interface adjusters R & V AJ of the corresponding nodes a through e connected to corresponding bus channels CH1 through CH7. The channel interface adjusters R & V AJ of the nodes a through e adjust the respective operating rates and the respective operating voltages of the respective channel interfaces in accordance with the respective parameter control signals PR_CTL's. Nodes f and g serve as bus matrix switches BUS MX SW1 and BUS MX SW2, and controlled by the data block controller 510.

In FIG. 24, for example, the node a is a main part of a CPU. Further, the node b is a RAM interface. The node c is a storage device. The node d is a network interface. The node e is an A/V decoder interface. For example, a stream of data is generated at the node d, and then provided via the bus channels CH5, CH2 and CH4 in this order, to the node b. For example, a regular block of data is generated in the node a, and then provided via the bus channels CH3 and CH4 in this order, to the node b. For example, a regular block of data is generated in the node b, and then provided via the bus channels CH4 and CH3 in this order, to the node a. For example, a regular block of data is generated in the node b, and then provided via the bus channels CH4, CH1 and CH5 in this order, to the node d. For example, a stream of data is generated at the node b, and then provided via the bus channels CH4, CH2 and CH6 in this order, to the node c. For example, a stream of data is generated at the node c, and then provided via the bus channels CH6 and CH7 in this order, to the node e.

As described above, according to the embodiments of the invention, the transfer operating rate and the operating voltage can be minimized depending on the traffic of a bus channel, and the entire power consumption for the transfer can be reduced in the bus system.

Further, according to the embodiments of the invention, the hardware of the bus managers 500, 504 and 506 and the data block managers 122-126 and 132-138 of the nodes 100, 104 and 106 and the like in the bus systems 10-16 supports data management in the unit of a block of data, the unit of a sub-block of data or a larger unit of data, which unit is independent of the hardware. This separates clearly control ranges of the hardware and of the software in hierarchical layers, and hence can efficiently organizes the communication of bus control information between the hardware and the software. In addition, based on the information related to the hardware resources acquired from the nodes, the software can efficiently manage the way of handling blocks of data in accordance with a predefined policy or rule. The hardware can manage the blocks of data in accordance with the requirements provided by the software. This allows the software to handle the block of data in accordance with the same policy, even if the hardware, the application or the like is changed. When the hardware or the application is changed, the possible range of transferring a block of data may vary. However, it is sufficient that the software determines as to whether each block of data can be transferred. Thus, the control of transfer by the software is not changed. This facilitates the software to match with the hardware, and hence facilitates the incorporation or transplant of the different software into the hardware. The centralized management procedure of the blocks of data can be determined by the software of the bus manager based on the parameters of the hardware forming the bus and in accordance with the same algorithm or a replaceable algorithm that can be changed if necessary. Thus, the hardware change can be facilitated by only setting hardware parameters into the algorithm. This reduces the complexity in changing or modifying the software when the hardware has been changed.

The above-described embodiments are only typical examples, and their combinations, modifications and variations are apparent to those skilled in the art. It should be noted that those skilled in the art can make various modifications to the above-described embodiments without departing from the principle of the invention and the accompanying claims.

What is claimed is:
1. A bus system comprising:
a plurality of node devices interconnected via a bus; and
a bus manager device connected to said plurality of node devices via respective bus control lines, wherein
said bus manager device receives one or more reservations of transfers of isochronous blocks of data to be transferred by corresponding one or more of said plurality of node devices,
in accordance with information on the one or more reservations of transfers of the isochronous blocks of data and with one or more requests for transfers of respective ones of the isochronous blocks of data and regular blocks of data, which requests are provided by one or more of said plurality of node devices, said bus manager device generates a schedule of an operating rate of a bus channel for each of the respective blocks of data, a number of assigned transfers per cycle of the bus channel for each of the respective blocks of data, and a size of a continuously transferred piece of data on the bus channel for each of the respective blocks of data, so that an expected average power consumption of the bus in terms of the bus channel operating rate for one or more transfer cycles is substantially lower, said bus manager device determines assignment of the bus channel to the blocks of data in accordance with the schedule and with the one or more requests for transfers of the respective blocks of data, said bus manager device provides information on the operating rate of the bus channel for each block of data and issues a grant of the bus channel, during a period of time determined in accordance with the size of the continuously transferred piece of data for that block of data and with the operating rate of the bus channel for that block of data, via the bus control line to one of said one or more node devices that transfers that block of data, and wherein the one node device that transfers that block of data maintains the request for transfer of that block of data, until the transfer of that block of data being requested for transfer is completed, and in response to a grant of the bus channel for that block of data that is issued by said bus manager device, the one node device transfers the piece of data of that block of data to another node device at the operating rate of the bus channel during the period of time of the grant of the bus channel, the operating rate being contained in the information received by the one node device.

2. A bus system according to claim 1, wherein one of said plurality of node devices is a central processing unit, and said central processing unit sends a signal indicative of the reservation of transfer of the isochronous block of data, directly to said bus manager device.

3. A bus system according to claim 1, wherein said bus manager device receives one or more signals indicative of the one or more reservations of transfers of the isochronous blocks of data, from said one or more node devices via respective lines dedicated for reservation of isochronous data block transfers.

4. A bus system according to claim 1, wherein said bus manager device is one of said plurality of node devices, and said bus manager device receives one or more signals indicative of the one or more respective reservations of transfers of the isochronous blocks of data, from said one or more node devices via the bus channel.

5. A bus system according to claim 1, wherein said bus comprises a plurality of bus channels including the first bus channel, and said bus manager device determines, as a part of the schedule, a transfer route which is to be used for the transfers of the isochronous blocks of data and which comprises at least one of the plurality of bus channels.

6. A bus system according to claim 1, wherein the one node device sends a transfer wait signal indicative of a suspension of transfer of the isochronous block of data, to said bus manager device via the bus control line, in response to the transfer wait signal, said bus manager device suspends a grant of the bus channel for the one block of data, and when there is another block of data that can be transferred on the same bus channel as the one block of data, said bus manager device issues a grant of the bus channel for the other block of data via the control line to the other one of said one or more node devices which transfers the other block of data, until the transfer wait signal disappears.

7. A bus system according to claim 1, wherein when said bus manager device receives a new reservation of transfer of an isochronous block of data to be transferred by one of said plurality of node devices or receives a request for transfer of a new regular block of data, or when the request for transfer of the isochronous block of data is terminated, said bus manager device re-generates the schedule.

8. A bus system according to claim 1, wherein said bus manager device generates a table of sequence of bus channel grants representative of a sequence of bus channel grants for blocks of data to be transferred in accordance with the schedule, and then generates a list of suspended transfers of blocks of data, the transfer of which is suspended due to a wait of transfer requested by the node device or due to a traffic on the bus channel, and in accordance with the table of sequence of bus channel grants and with the list of suspended transfers, said bus manager device issues grants of the bus channel sequentially for the blocks of data which can be transferred and are indicated in the table of sequence of bus channel grants.

9. A bus manager device connected via bus control lines to a plurality of respective node devices in a bus system, said bus manager device comprising:

a reservation management unit for managing reservations of isochronous data block transfers, said reservation management unit receiving one or more reservations of transfers of isochronous blocks of data to be transferred by corresponding one or more of said plurality of node devices;

a data block control unit for generating a schedule of an operating rate of a bus channel, a number of assigned transfers per cycle of the bus channel, and a size of a continuously transferred piece of data on the bus channel for each of one or more of the isochronous blocks of data and regular blocks of data so that an expected average power consumption of the bus in terms of the bus channel operating rate for one or more transfer cycles is substantially lower, in accordance with information on the one or more reservations of transfers of the isochronous blocks of data and with one or more requests for transfers of the respective blocks of data, the information being provided by said reservation management unit, the one or more requests being provided by one or more of said plurality of node devices, wherein in accordance with the schedule and with the one or more requests for transfers of the respective blocks of data, said data block control unit determines assignment of the bus channel to the one block of data scheduled in a period of time, the period of time being determined in accordance with the size of a continuously transferred piece of data and the operating rate of the bus channel for the one block of data; and a bus channel management unit for providing information on the operating rate of the bus channel and issuing a grant of the bus channel for the one block of data, via the bus control line to one of the node devices that transfers the one block of data, in accordance with the assignment of the bus channel to the one block of data.

10. A node device connected via a bus control line to a bus manager device in a bus system, said node device comprising:

one or more channel interfaces with respective one or more bus channels, for operating for transfer at respective operating rates and voltages of the respective one or more bus channels, the operating rates and voltages being determined by said bus manager device;

an adjuster unit for adjusting the operating rates and the operating voltages of said one or more channel interfaces in accordance with control information received from said bus manager device;

one or more data block management units coupled to respective one or more buffer memories, for managing requests for transfers of blocks of data to be transferred, a positive or negative condition for transferring the blocks of data due to a factor of operation of said node device, and to the states of progress of the transfer of the blocks of data, each of said one or more data block management units providing a piece of data of a particular block of data read from a corresponding one of said one or more buffer memories to a corresponding one of said one or more channel interfaces and/or receiving another piece of data of another particular block of data from a corresponding one of said one or more channel interfaces and then writing the other piece of data into a corresponding one of said one or more buffer memories; and a switch connected to said one or more channel interfaces and to said one or more data block management units, for selectively coupling said one or more channel interfaces to said one or more data block management units.

11. A program recorded on a recording medium for use in a bus manager device connected via bus control lines to a plurality of respective node devices in a bus system, said program being operable to effect the steps of:

receiving one or more reservations of transfers of isochronous blocks of data to be transferred by corresponding one or more of said plurality of node devices;

generating a schedule of an operating rate of a bus channel, a number of assigned transfers per cycle of the bus channel, and a size of a continuously transferred piece of data on the bus channel for each of one or more of the isochronous blocks of data and regular blocks of data so that an expected average power consumption of the bus in terms of the bus channel operating rate for one or more transfer cycles is substantially lower, in accordance with information on the one or more reservations of transfers of the isochronous blocks of data and with one or more requests for transfers of the respective blocks of data, the one or more requests being provided by one or more of said plurality of node devices;

determining, in accordance with the schedule and with the one or more requests for transfers of the respective blocks of data, assignment of the bus channel to the one block of data scheduled in a period of time, the period of time being determined in accordance with the size of a continuously transferred piece of data and the operating rate of the bus channel for the one block of data; and providing information on the operating rate of the bus channel and issuing a grant of the bus channel for the one block of data, via the bus control line to one of the node devices that transfers the one block of data, in accordance with the assignment of the bus channel to the one block of data.

* * * * *